(12) United States Patent
Waring et al.

(10) Patent No.: US 6,960,313 B2
(45) Date of Patent: Nov. 1, 2005

(54) METHOD AND APPARATUS FOR INSTALLING A FLEXIBLE TUBULAR LINER

(75) Inventors: Stephen T. Waring, Davis, CA (US); Steven R. Leffler, Keizer, OR (US)

(73) Assignee: rePipe Holdings, Inc., Houston, TX (US)

(*) Notice: Subject to any disclaimer, the term of this patent is extended or adjusted under 35 U.S.C. 154(b) by 229 days.

(21) Appl. No.: 10/312,131

(22) PCT Filed: Jun. 20, 2001

(86) PCT No.: PCT/US01/19601

§ 371 (c)(1),
(2), (4) Date: Dec. 19, 2002

(87) PCT Pub. No.: WO01/98061

PCT Pub. Date: Dec. 27, 2001

(65) Prior Publication Data

US 2003/0209823 A1    Nov. 13, 2003

Related U.S. Application Data

(63) Continuation-in-part of application No. 09/599,820, filed on Jun. 21, 2000, now Pat. No. 6,390,795.

(51) Int. Cl.[7] .............................................. B29C 63/36
(52) U.S. Cl. ....................... 264/36.17; 138/98; 156/94; 156/287; 425/11; 425/387.1; 264/516
(58) Field of Search .............................. 425/11, 387.1, 425/503; 264/36.17, 269, 516; 156/287, 156/294, 423, 94; 138/98

(56) References Cited

U.S. PATENT DOCUMENTS

| | | | | |
|---|---|---|---|---|
| 4,385,885 A | * | 5/1983 | Wood | 425/387.1 |
| 4,668,125 A | * | 5/1987 | Long, Jr. | 156/294 |
| 4,685,983 A | * | 8/1987 | Long, Jr. | 156/294 |
| 5,154,936 A | * | 10/1992 | Driver et al. | 425/387.1 |
| 5,942,183 A | * | 8/1999 | Alexander, Jr. | 264/516 |
| 6,390,795 B1 | * | 5/2002 | Waring et al. | 425/11 |

* cited by examiner

Primary Examiner—James P. Mackey
(74) Attorney, Agent, or Firm—Mark H. Miller; Jackson Walker LLP

(57) ABSTRACT

A method and an apparatus for use in installing a liner in a conduit as part of a repair procedure, the apparatus including a sealing inlet port (106) for passage of the tubular liner (72) into an enclosed container (52) where an increased pressure is maintained to move the tubular liner into the conduit (179) and to evert it as it moves along the conduit. A clamp (80) holds one end of the liner to the outlet side of an everter box (50) supported on a frame (18) that may be mounted on a trailer hitch receptable. The sealing inlet port includes a pair of lips (112, 114) to press against the opposite sides of a flattened liner. Support members (148, 150) keep the lips from being forced back out toward the outside of the pressurized everter box and control friction between the lips and the liner. Inlet and outlet fittings are provided. The apparatus is portable on a trailer hitch receiver.

31 Claims, 31 Drawing Sheets

METHOD AND APPARATUS FOR INSTALLING A FLEXIBLE TUBULAR LINER

This is a continuation-in-part of U.S. patent application Ser. No. 09/599,820, filed Jun. 21, 2000, which issued May 21, 2002 as U.S. Pat. No. 6,390.795, entitled Apparatus for Everting a Tube.

BACKGROUND OF THE INVENTION

The present invention relates to an apparatus for everting and curing a flexible tube as a liner in the interior of a hollow tubular conduit, such as a previously existing underground sewer pipe.

One of the more successful pipe repair or rehabilitation processes which is currently used is described in Wood, U.S. Pat. No. 4,064,211. Wood, U.S. Pat. No. 4,385,885 discloses apparatus useful in installing a liner according to the process described in U.S. Pat. No. 4,064,211, and briefly mentions, but does not describe, a lip seal, used in conjunction with a pair of controlled rollers to feed a liner into a conduit that is to be repaired. Various other sealing devices have been disclosed for use in connection with using fluid under pressure to evert a liner and extend it into a conduit to be repaired, as shown, for example, in Alexander, Jr., U.S. Pat. Nos. 5,597,353 and 5,942,183, Long, Jr., U.S. Pat. No. 5,358,359, Driver, et al., U.S. Pat. Nos. 5,154,936 and Re. 35,944.

Other apparatus for use in installing and everting a liner, as disclosed in Long, Jr., U.S. Pat. Nos. 4,668,125 and 4,685,983, has been quite large, and has avoided the use of a seal to maintain pressure within a portion of an apparatus by instead using a relatively tall column of water to provide the necessary fluid pressure within the liner being everted.

Such apparatus has been undesirably unwieldy and expensive. Because of its size, such apparatus is difficult or even dangerous to use in residential areas where fences obstruct access to conduits in need of repair, and such tall support apparatus presents a risk of inadvertent contact with electric power lines. Additionally, the weight of some such apparatus, particularly when filled with water, makes its use difficult wherein there is no paved surface near the point of access to the conduit to be repaired.

The need to ensure stability of such tall and heavy apparatus also presents some concerns that it is desired to avoid.

For installation of lines in relatively small and short conduits in some cases an entire prepared liner has been stacked inside a closed container, such as a special truck body, and the liner has been everted directly from within the truck. This method, however, presents difficulty in assuring that a liner is extended and everted smoothly and requires a container of special construction to contain and withstand the force of the pressurized fluid needed to extend and evert the liner tube.

What is desired, then, is to provide a system including conveniently small, safe, and relatively inexpensive apparatus useful to evert and install a flexible tubular liner into a conduit quickly and efficiently.

BRIEF SUMMARY OF THE INVENTION

The present invention supplies an answer to the aforementioned need for a relatively small, handy, and inexpensive apparatus for use in installing a flexible tubular liner in a conduit, by providing an apparatus in which there is a sealing inlet port for admitting a liner in the form of a flattened flexible tube into a pressurized chamber for everting and extending such a flexible tube into position for use to repair or line a conduit. The apparatus includes a container for holding air or another fluid under pressure to act on the flexible tube and from which the flexible tube is expelled from the pressurized chamber to be inverted by the pressure inside the chamber. The sealing inlet port is provided in the container to allow the tubular liner to enter the container in a flattened configuration without significant loss of pressure where the tube enters the container so that the pressure of the fluid in the container can be used to evert and extend the tubular liner into the required position within a conduit.

The sealing inlet port in one embodiment of the invention includes a base defining an elongate narrow mouth, and a pair of associated lips extend inward for a distance from the base, facing each other. In use of the sealing port, fluid under pressure surrounding the lips urges the lips together and against an object such as the flattened flexible tube passing through the sealing inlet port, to seal the inlet port yet allow the flexible tube to slide between the lips.

In a preferred embodiment of the invention the sealing inlet port can provide a sealing effect yet permit a rope, a lay-flat hose, a strap, or other installation hardware and fittings to slide between the lips.

In a preferred embodiment of the sealing inlet port an elongate support member is fastened to each of the lips to keep them in the necessary positions and prevent them from being expressed from within the container of fluid under pressure.

In one embodiment of the invention such elongate support members are spaced apart from each other, urging respective portions of the lips apart from each other to limit friction between the lips and the flattened liner tube.

In accordance with the invention the lips provide a sealing closure around the flattened tube being everted, but the lips are short enough and are supported sufficiently by the support members that the friction between the lips and the tube is small enough that the pressure in the container urging the lips toward each other and the tube is sufficient to cause the tube to extend and be everted to a desired length.

In one embodiment of the invention a cover plate provides support for the base to which the lips are attached, and associated shutters provide a slot having an adjustable size extending through the cover plate.

In one preferred embodiment of the invention the apparatus includes a liner everter box having the sealing inlet port at its top end and including an outfeed opening at its bottom end, through which the flexible liner tube can proceed out from the liner everter box.

In one preferred embodiment of the invention a clamp associated with the outfeed opening from the liner everter box includes a conical inner clamping surface surrounded by a circular outer clamping seat or rim, together with linkages holding the two together to grip an end portion of a flexible tube between the conical inner clamping face and the surrounding clamping rim.

In one preferred embodiment of the invention a support frame holds the liner everter box in an appropriate position so that an everted liner extending from the outfeed opening can be directed conveniently to the appropriate position to enter into a conduit needing to be repaired.

In one embodiment of the invention the support frame includes adjustable legs, adjustable wheeled struts, and a mounting arm adapted to be received in a trailer hitch receiver on a motor vehicle.

In one preferred embodiment of the invention the support frame and everter box together are small and light enough to be mounted on a trailer hitch receiver on a small vehicle such as a pickup truck, to be moved easily in restricted spaces where pipes may need repairs, as in residential neighborhoods, without likelihood of causing contact with overhead utility wires.

In another preferred embodiment of the invention a pair of guide rollers are mounted on the support frame above the liner everter box.

The invention also provides a system of apparatus for use in helping to cure a resin-impregnated liner in a conduit being repaired, including a pressure retaining inlet fixture, or steam cap, which may be desired in some situations, to replace the liner everter after the liner has been everted. Such a system includes fittings permitting introduction of steam, water, and air at controlled temperatures, and a pressure regulating system to be connected to the opposite end of the liner.

The invention also provides a method for installing and curing in-place a resin-impregnated liner for conduits such as sewer systems, for assuring proper curing of such a liner, using steam in one embodiment to provide required heat, and using a pig to push out condensate accumulations in low areas.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
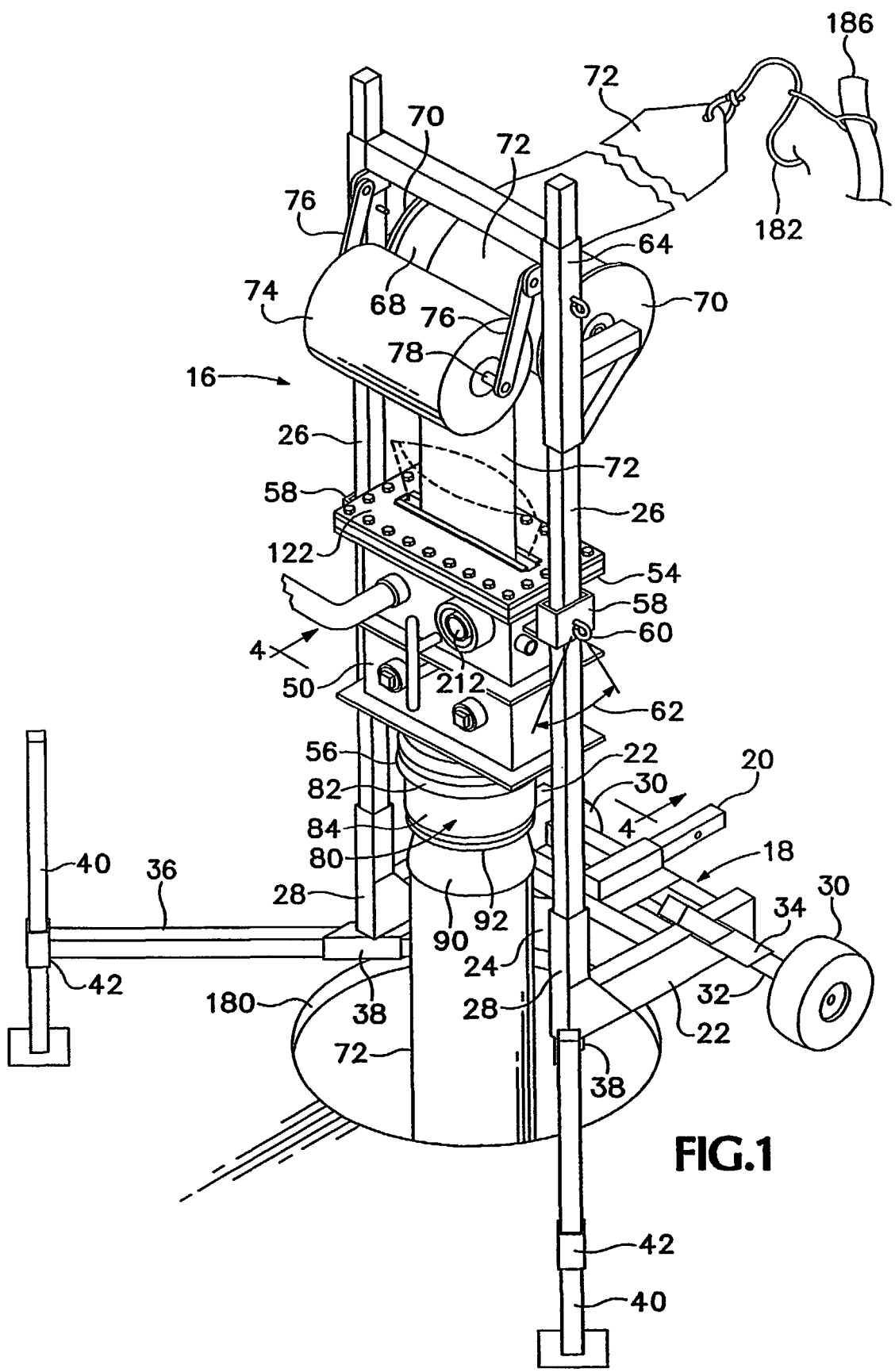
FIG. 1 is an isometric view showing a tube everter apparatus which is one embodiment of the present invention.

Referring now to the drawings which form a part of the disclosure herein, an everter apparatus 16 which is one preferred embodiment of the present invention includes a frame 18 of metal, preferably aluminum, including a mounting arm 20 adapted to fit and be fastened in a trailer hitch receiver of a motor vehicle, for transport of the apparatus to a location where access is available to a conduit that is to be repaired. A pair of longitudinal side members 22 are spaced apart from each other and define an open space 24 therebetween. A pair of upright support members 26, preferably of steel tubing, each extend upward from a respective one of the side members 22 and may be attached to the side members 22 by fitting within respective sleeve-like sockets 28.

A pair of ground wheels 30, which may have rubber tires, are mounted rotatably on respective struts 32, each fastened to a respective one of the side members 22, as by being mounted adjustably and removably within a respective support sleeve 34. A respective one of a pair of horizontal extension members 36 is attached to each of the side members 22 by a horizontal sleeve 38. Each of the sleeves 38 extends diagonally outward from a respective one of the side members 22 on which it is mounted. A respective vertical support leg 40 is adjustably held within a mounting sleeve 42 on each of the horizontal extension members 36. The vertical support legs 40 may be adjusted by locking pins and corresponding holes, to rest on the ground and support the side members 22 so that the frame 18 is suitably supported where a flexible tube is to be installed, such as, for example, a location where the open space 24 is located above a manhole, as illustrated in FIG. 1.

The entire apparatus, in a preferred embodiment, has a weight of less than 400 pounds, so it can be transported by being mounted in a trailer hitch receiver of suitable strength with the struts 32, extension members 36, and legs 40 retracted or removed.

Located between the upright support members 26 is a liner everter box 50 which, for light weight, is manufactured of aluminum plates welded together to form a generally rectangular container 52 including a flange 54 at its top end and having a generally tubular outfeed fixture 56 mounted on its bottom end. The everter box 50 is attached to the upright support members 26 by a pair of mounting sleeves 58 attached to opposite sides of the container 52 and fitting loosely about the upright support members 26. Horizontal mounting pins 60 extend through respective coaxial bores defined in each mounting sleeve 58 and corresponding bores in the upright support members 26, allowing the liner everter box 50 to pivot about an axis defined by the mounting pins 60, through an angle 62 with respect to the upright support members 26.

A moveable subframe 64 is attached removably to the upright support members 26 a convenient distance above the mounting sleeves 58 and supports a first generally cylindrical roller 68 for rotation about a generally horizontal axis that extends parallel with the axis defined by the mounting pins 60. The roller 68 has a pair of flanges 70 each extending radially from the surface of the roller 68 at a respective one of its opposite ends. The roller 68 is mounted in a fixed location with respect to the subframe 64.

A second roller 74 is also carried on the moveable subframe 64, to which it is attached by a pair of similar parallel swing arms 76 between which a roller shaft 78 extends. The second roller 74 is similar in its diameter to the size of the roller 68, but is slightly shorter in length, so that the second roller 74 fits between the flanges 70, allowing the peripheral surface of the second roller 74 to move into contact with the peripheral surface of the roller 68. Ordinarily, during use of the everter apparatus 16, a prepared liner tube 72 to be installed in a conduit being repaired extends over the first roller 68 and thence down through a liner passage space established between the first roller 68 and the second roller 74 merely by moving the second roller 74. The weight of the second roller 74, acting through the swing arms 76, urges the second roller 74 against such a liner tube 72, holding it neatly and appropriately in place along the peripheral surface of the first roller 68.

The entire apparatus has a height, in a preferred embodiment, of no more than about 10 feet so that it is convenient to use and does not present a risk of encountering normal overhead utility lines.

Attached to the outfeed fixture 56 at the bottom end of the container 52 is a liner attachment clamp 80, held in place by a fastening collar 82, with a gasket 83 included between the fixture 56 and the liner attachment clamp 80 to provide a seal to retain pressure. The attachment clamp 80 may be constructed in various sizes and is used in a size particular to the size of the liner tube 72 to be installed, to retain the first, or near end 92 of the liner tube 72 and create a tight seal between the liner tube 72 and the interior of the container 52. Pressure can then be applied to the fluid within the interior of the container 52 to evert the liner tube 72 and force it to extend into position within the conduit which is to be repaired using the everter apparatus 16. To that end, the attachment clamp 80 includes an upper sleeve portion 84, shown in section view in FIG. 4, which fits snugly within the lower end of the outfeed fixture 56. A radially outwardly extending flange of the upper sleeve portion 84 fits against the lower end of the outfeed fixture 56, and radially inwardly extending flanges of the collar 82 hold the upper sleeve 84 together with the lower end of the outfeed fixture.

An outer clamping seat 86 is located at the bottom end of the upper sleeve 84 and extends radially inward in the form of a rim, defining a circular opening, in the embodiment shown.

An inner tubular portion 90 is frusto-conical and has an open upper end that is smaller than its lower end and also smaller than the opening. The upper end is also small enough to fit a short distance into the open near end 92 of the liner 72.

At least two ears 94 extend radially outward from the exterior of the inner tubular portion of the attachment clamp 80, and correspondingly located clamp lever arms 96 are mounted on the upper sleeve portion 84. Each clamp lever arm 96 carries a U-shaped bail 98 of adjustable length as well as a latching hook 100, so that when the bail 98 engages a respective gear 94 and the clamp lever arm 96 is raised, the latching hook 100 can engage a corresponding shoulder on a mounting base 102 on the outside of the upper sleeve 84.

Figure 4:
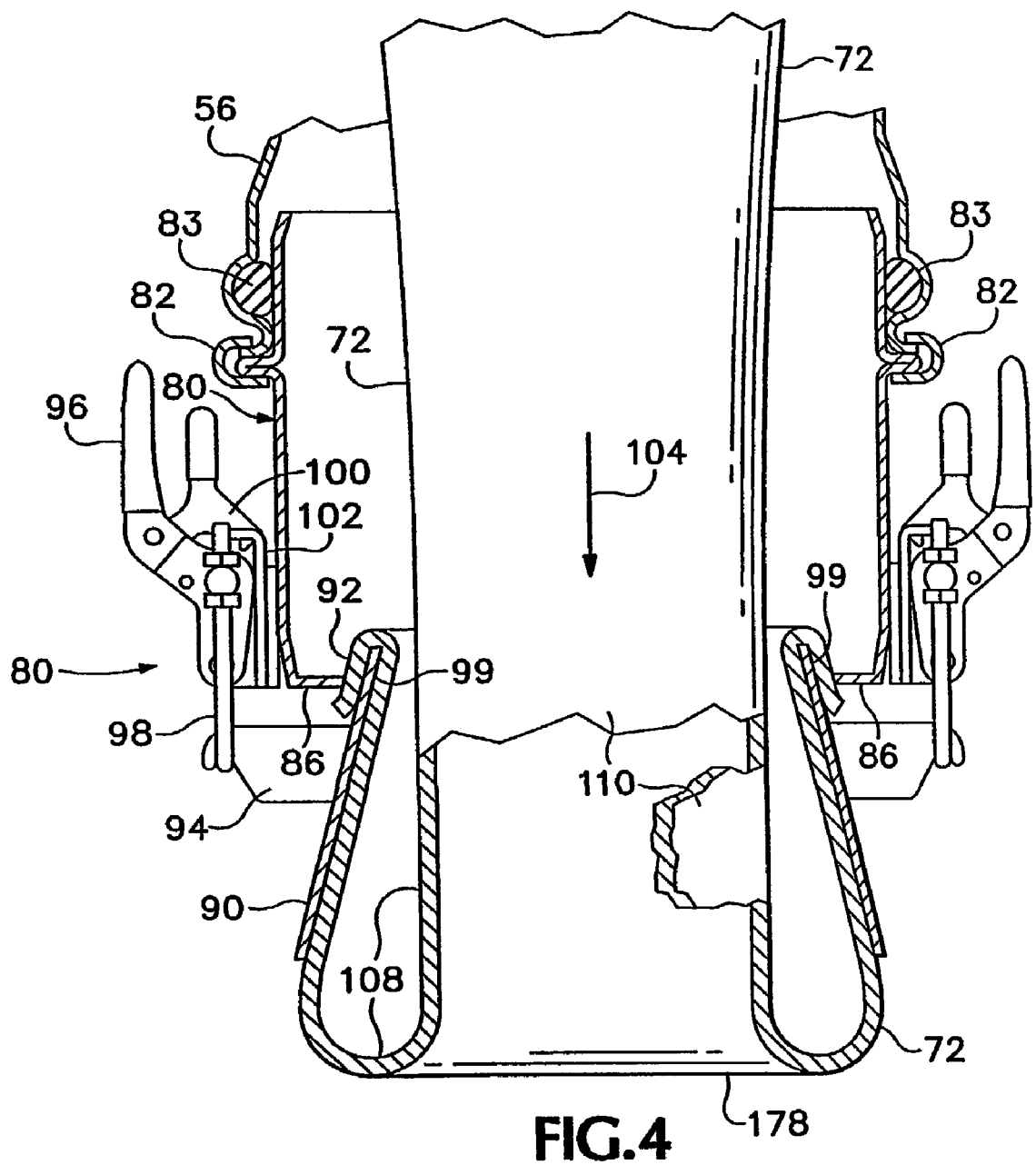
FIG. 4 is a sectional view, taken along line 4—4 of FIG. 1, showing the outlet fixture and liner clamp portions of the apparatus shown in FIG. 1, at an enlarged scale, with a tubular liner fastened to the outlet fixture of the everter box in readiness for being everted and extended.

With the smaller end of the inner tubular portion of the clamp 80 extending a small distance into the near end 92 of the liner 72 the clamp lever arms 96 are raised and latched, to grip the near end 92 of the liner between a clamping seat portion 99 of the inner tubular portion 90 and the outer clamping rim 86, as shown in FIG. 4, with sufficient force to prevent the near end 92 from becoming dislodged during operation of the everter apparatus 16. The liner 72, folding back inside the portion gripped by the clamp 80, extends downward through the interior of the inner tubular portion 90, thus being everted as more of the length of the liner 72 passes through the inner tubular portion 90 of the attachment clamp 80 in the direction indicated by the arrow 104.

At the upper end of the everter 50, the liner 72 extends downward from the space between the rollers 68 and 70 and moves into the interior of the container 52 through a sealing inlet port 106 in response to elevated fluid pressure within the container 52 acting on the surfaces 108 of the liner 72 to evert and extend it through the outfeed fixture 56. The liner 72 is typically of one or more layers of felt, usually a needled felt of polyester fibers, 3 mm–6 mm thick, sewn into the form of a tube, with a layer 110 of a flexible polymeric plastic material such as a 10- or 15-mil polyurethane film bonded to the felt, usually by spraying the polyurethane onto the felt in a liquid state and allowing it to fuse onto and around the fibers in the outermost part of the layer of felt. Shortly prior to installation of a liner 72 the felt is usually impregnated with a quantity of an uncured resin which is contained within the liner 72 and within the plastic film layer 110 on whose surfaces 108 pressure acts within the container 52.

In one embodiment of the present invention, the sealing port 106 includes a pair of lips 112, 114, shown in FIGS. 7, 8, 9 and 10, which in one preferred embodiment of the invention extend from a base 116 which has an outer face 118 and an opposite inner face 120. The base 116 is in the form of a base sheet assembly of multilayered construction and is attached to the flange 54 at the upper end of the container 52 by a cover plate 122 and several fasteners such as bolts 124 threaded into the flange 54. The cover plate 122 supports the base 116 when fluid pressure within the interior of the container 52 is increased with respect to the ambient air pressure surrounding the everter apparatus 16. The cover plate 122 defines a slot 125 of ample size including long parallel sides interconnected by short ends, through which the flattened liner 72 passes into the container 52.

The base 116 defines a long, narrow inlet mouth 126 which has a length 127 and a pair of opposite sides 128 generally parallel with each other and spaced apart by a distance 130 that is sufficient to permit passage of the flattened liner 72.

Figure 9:
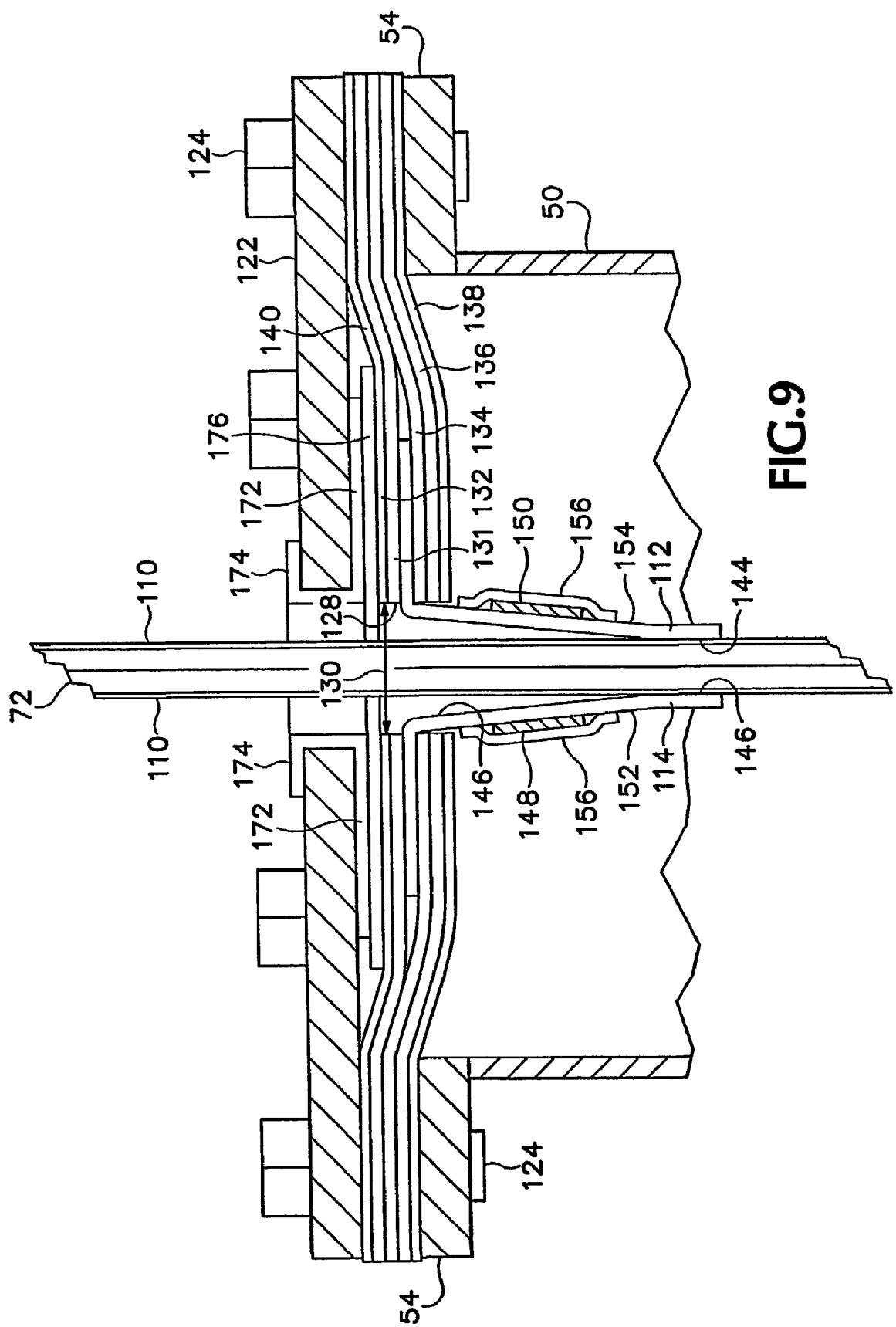
FIG. 9 is a sectional view, taken along line 9—9 of FIG. 5, showing the sealing inlet port and a flattened tubular liner passing into the everter box through the sealing inlet port.
Figure 10:
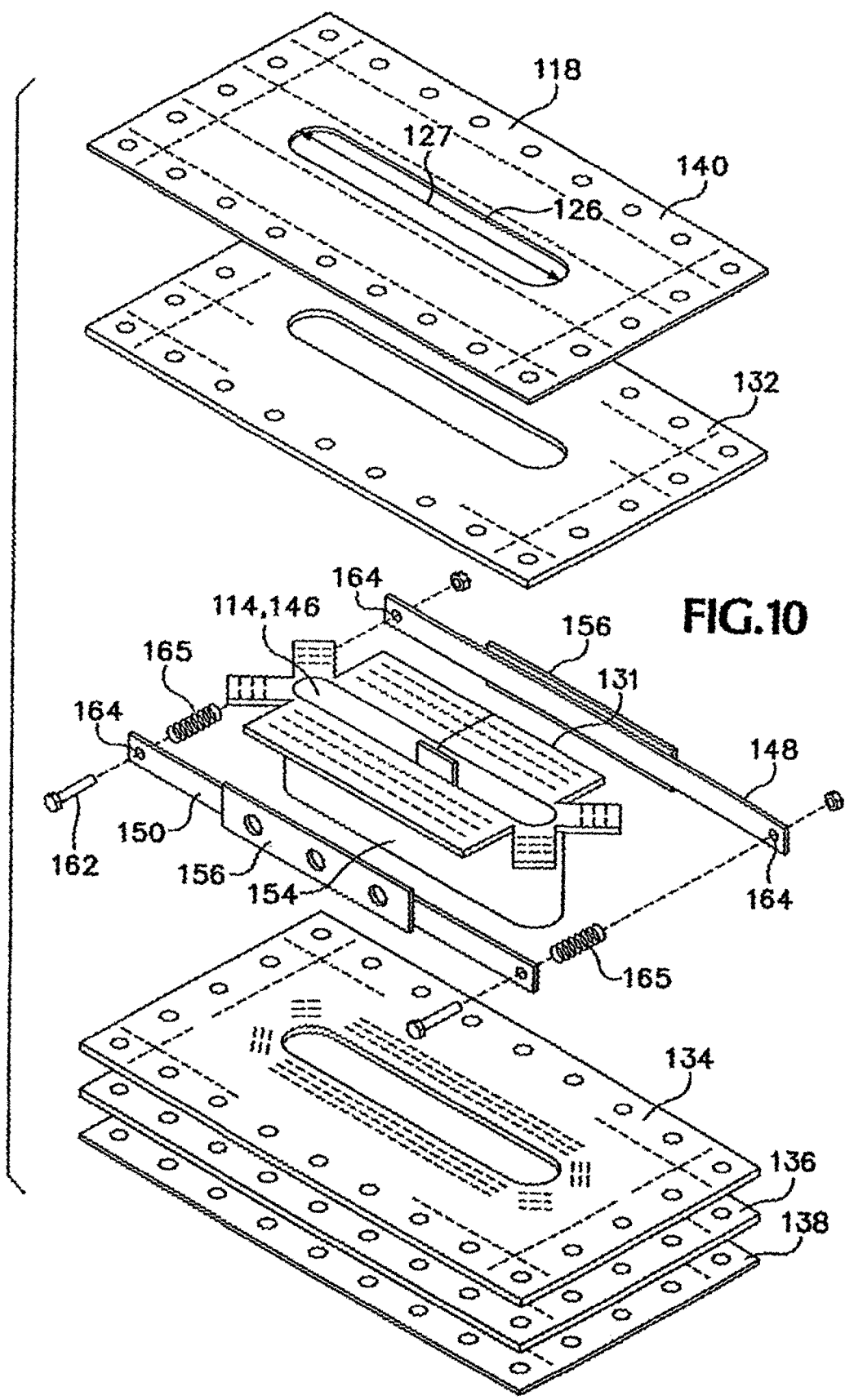
FIG. 10 is an exploded isometric view of the inlet seal shown in FIGS. 7, 8 and 9.
Figure 11:
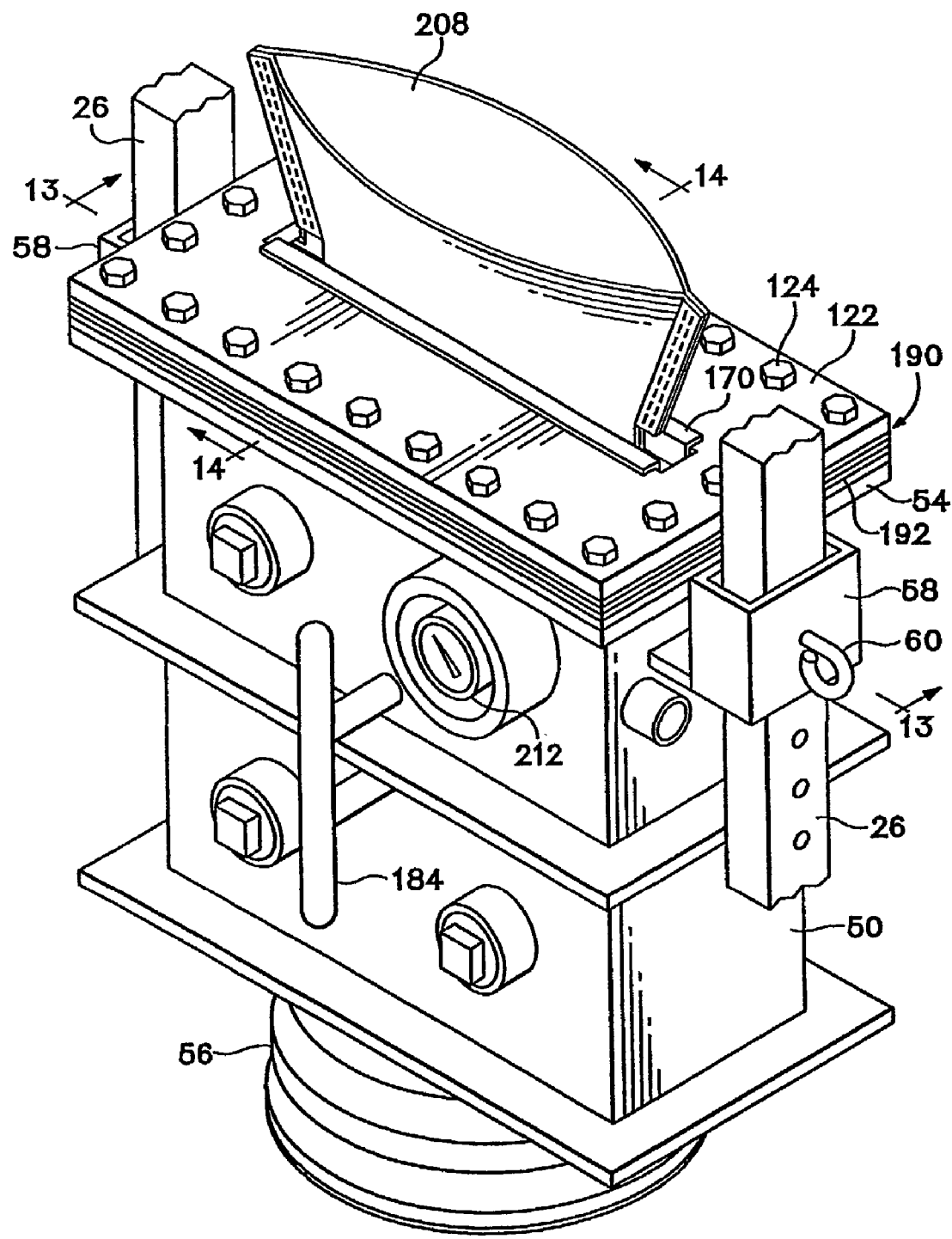
FIG. 11 is an isometric view taken from the upper right front corner of the everter box shown in FIG. 1, at an enlarged scale, showing upright portions of the support structure and a funnel-like liner-guiding assembly associated therewith.
Figure 12:
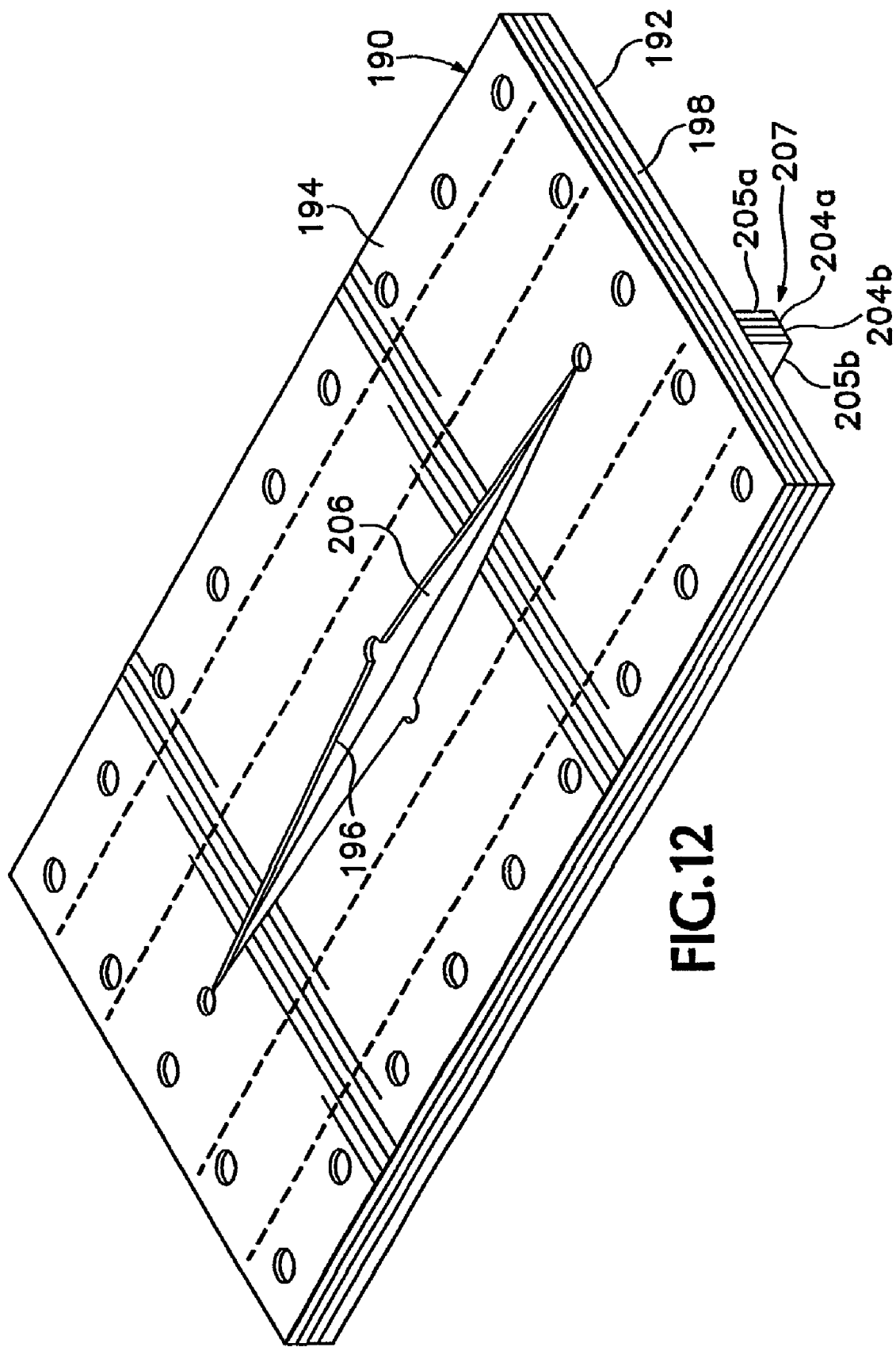
FIG. 12 is an isometric view of an inlet seal assembly which is an alternative embodiment of the present invention.
Figure 13:
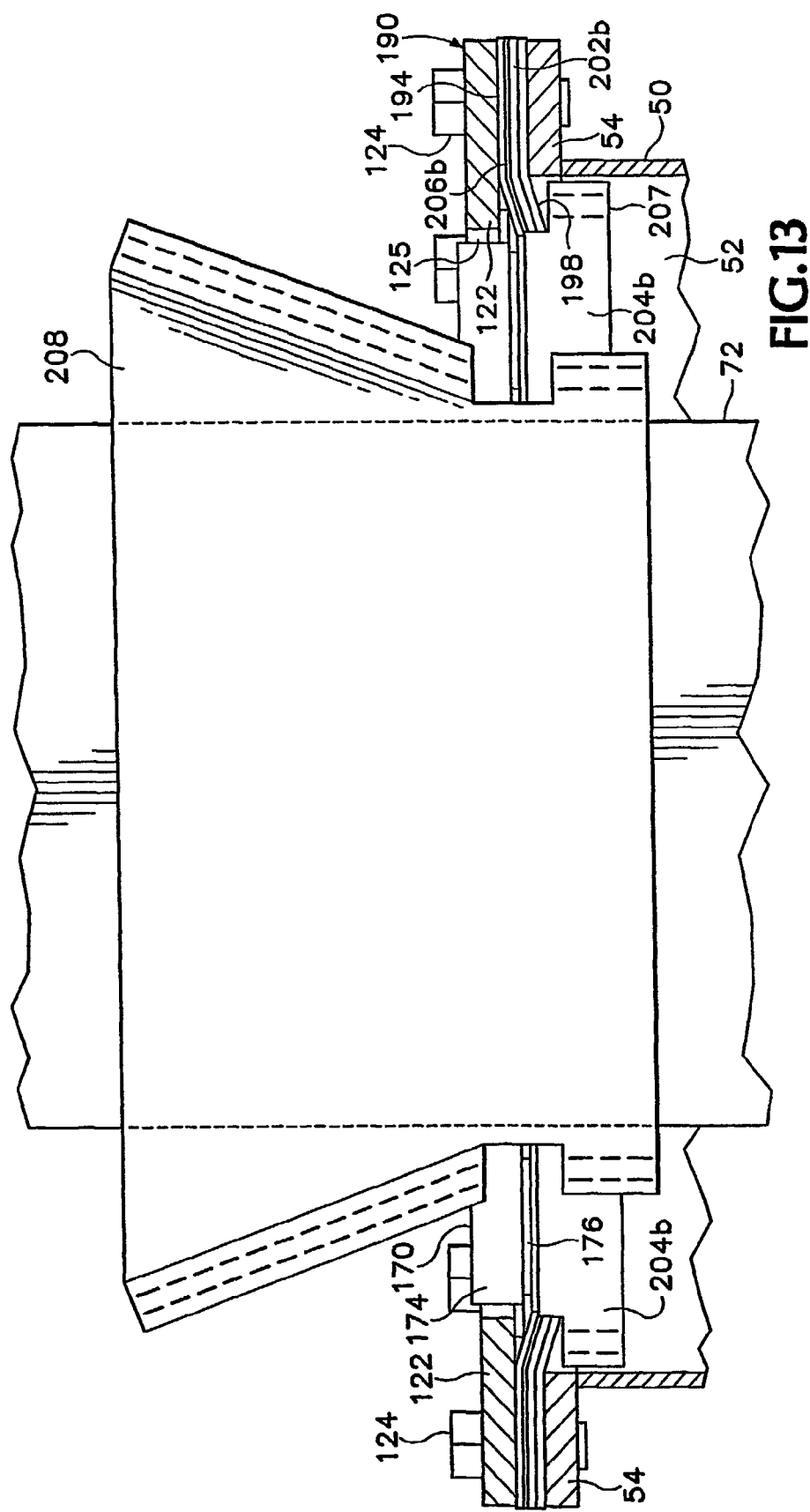
FIG. 13 is a sectional view, taken along line 13—13 of FIG. 11, showing the inlet seal shown in FIG. 12 installed in the upper end of the everter box, together with the liner-guiding assembly.

The lips 112, 114 are included in a short tubular piece of strong flexible sheet material such as the felt of which the liner tubes are typically manufactured, and which has an attached airtight layer 110 of flexible polymeric plastic material such as an intimately adhered 10–15 mil polyurethane film. The tubular portion defining the lips 112, 114 may be made by sewing in place a small connecting piece of felt, as shown in FIGS. 9 and 10. The tubular portion including the lips 112, 114 is attached to the base 116, as by sewing, with the attached end 131 of the tube opened as shown best in FIG. 10. The base 116 preferably includes a pair of layers 132, 134 of such felt with an adhered film 110 of a flexible plastic material. The base 116 may be assembled with the plastic film 110 of each layer facing toward the plastic film of the other of those two layers. Thus the polyurethane layer 110 of the layer 134 is uppermost, while the polyurethane layer 110 of the layer 132 faces downward. The opened end 131 of the tube, including the lips 112, 114, is sandwiched between the layers 132 and 134 as seen best in FIGS. 8 and 9, and the opened end portion 131 is preferably sewn to the layer 134, preferably with two or three lines of stitches, as indicated in FIG. 10, with the tube extending down through the opening in the layer 134.

A layer 136 of a rubberlike material, such as a 1/8-inch-thick silicone rubber, is located in contact with the lower layer 134 of felt and plastic, and a bottom sheet 138 of a polymeric plastic able to withstand temperatures at least as high as about 250°–300° F., such as a sheet of PTFE (polytetrafluoroethylene) 1/32 inch thick, is located in contact with the layer 136 of rubber, forming the inner face 120 of the base 116. PTFE is desirable, because of its ability to withstand the temperatures which may result from the introduction of steam into the liner receiver 50 to heat the uncured resin with which the liner 72 is impregnated, in order to cause it to commence curing once it has been installed. A thicker layer 140 of plastic, such as PTFE 1/16–1/8 inch thick, is located in contact with the upper layer 132 of felt and plastic and includes the outer face 118 of the base 116. All of the layers may then be sewn together.

The lips 112, 114 extend generally parallel with each other away from the base 116 in an inward direction, toward the interior of the container 52, for a distance 142, which may also be referred to as a depth of each lip 112, 114. The distance 142 is preferably in the range of 1 to 6 inches, depending on the size of the liner 72, and is, for example, about 3 1/4 inches, when the distance 130 between the opposite sides 128 of the mouth 126 is 1 1/2 inches, so that there is ample area in the lips 112, 114 to be acted upon by the fluid contained under pressure within the container 52, to urge the lips 112, 114 toward each other so that their mutually confronting sealing surfaces 144, 146 are forced to bear against the surfaces 108 of the liner tube 72 where it extends through the sealing port 106.

The lips 112, 114 are supported by elongate resiliently flexible supporting members 148, 150 extending along the exterior surfaces 152, 154 of the lips 112, 114. Each of the support members 148, 150 may be a steel strap 0.5 inch-1.375 inch wide and 0.075–1.125 inch thick, for example, and is attached to the respective lip 112 or 114 by extending through a tube defined by a strip 156 of flexible material, preferably the same sort of felt material of which the lips 112, 114 are made. The strips 156 are attached preferably by being stitched along their margins, leaving a space wide enough to admit the support member 148 or 150.

Each support member 148, 150 has a length 160 somewhat greater than the length of the mouth 126, and a fastener such as a bolt and nut combination 162 extending through holes 164 interconnects the support members 148, 150 with each other loosely, to establish a maximum separation between them. The support members 148, 150 thus prevent the lips 112, 114 from being forced out through the mouth 126 when the container 52 is pressurized.

In this embodiment of the invention a helical compression spring 165 is preferably located on each bolt 162 between the support members 148 and 150, urging them apart from each other toward the position of maximum separation permitted by the bolts 162 or equivalent fasteners. The support members 148, 150 thus serve to urge the lips 112, 114 apart from each other, counteracting a portion of the force of fluid under pressure within the container 52 to reduce friction acting on the surface of the liner 72 as it passes into the interior of the liner everter box 50, but with a small enough force that the lips 112, 114 are not prevented from forming a seal. Thus the support members 148, 150 prevent the lips 112, 114 from being forced out through the mouth 126 yet the springs 165 permit the sealing surfaces of the lips 144, 146 to be pressed into contact with each other and against the surfaces 108 of the liner 72 being everted.

The sealing surfaces 144 and 146 are preferably lubricated to facilitate passage of the liner 72 through the sealing inlet port 106, by impregnating the felt of the lips 112, 114 with a lubricant such as a silicone lubricant having a kinematic viscosity of 100,000 centistokes, available from Dow Corning as its Series 200 silicone lubricant, for example.

A liner such as the liner 72 is typically prepared by impregnating the felt layers with the appropriate uncured thermosetting resin, with the polymeric plastic film layer outermost, containing the resin. The liner is then placed in a refrigerated container to prevent the resin from curing until the liner has been properly installed within a conduit to be repaired. Since the length of a liner may be up to several hundred feet, small amounts of air contained within a liner may accumulate and form a bubble within a liner 72 outside the liner everter box 50. Because of the cooperation of the rollers 68 and 74, such a bubble will usually remain between the rollers and the container in which the liner is stored prior to installation. To provide additional guiding support to keep the liner 72 properly aligned and flattened as it enters the liner everter 50, however, a pair of convergent guiding members 166 may be provided on the outside of the cover plate 122. The guiding members 166 may preferably be made of a low-friction sheet polymeric plastic material thick enough to provide ample support considering the size of the liner 72, and preferably may be of PTFE 1/16 inch thick, and thus they also act as slip sheets. They are generally fan-shaped, with margins 168 interconnected as by being sewn together to form a flattened funnel leading into the slot 125 defined in the cover plate 122. The funnel formed by the guiding members 166 squeezes the liner 72, should it contain a significant bubble, urging the liner 72 into its required flattened form so that it can pass through the sealing inlet port 106. The guiding members 166 may extend only a short distance into the mouth 126, or in another embodiment of the invention may extend further into the cavity defined within the interior of the container 52.

Preferably, an adjustable slot filler assembly 169 is provided to adjust the size of the slot 125 extending through the cover plate 122. Such a filler assembly preferably includes a pair of opposite shutters 170 that are similar to each other. Each has a flat base portion 172 extending along the inner surface of the cover plate 122, and an upstanding wall portion that stiffens the shutter 170 and extends upward into the slot 125 to narrow it to approximate more closely the size of a flattened liner 72. Two opposite flat end plates 176 extend transversely with respect to the shutters 170 and may be moved toward or away from each other adjacent to the ends of the slot 125 to reduce the length of the slot 125 similarly to more closely approach the size of the flattened liner tube 72 where it enters into the liner receiver 50 through the sealing port 106. The shutters 170 and end plates 176 fit snugly between the base portion 116 and the cover plate 122, so that once they are adjusted to the size of a particular liner 72 they will remain in the desired position, particularly when the interior of the container 52 is subjected to increased fluid pressure which will urge the base 116 more tightly into contact against the end plates 176, shutters 170, and cover plate 122.

Figure 2:
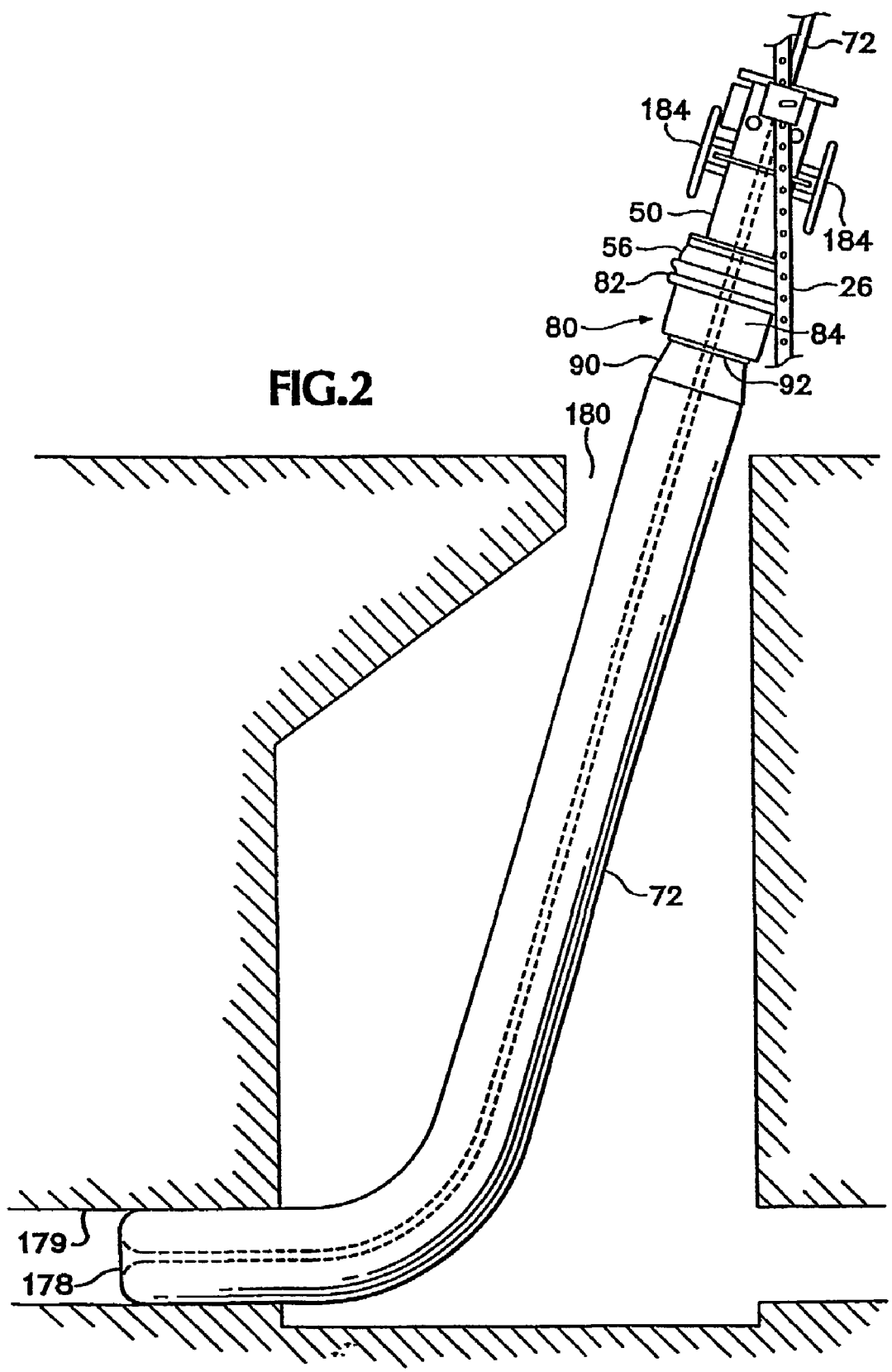
FIG. 2 is a semi-diagrammatic representation illustrating the manner in which the apparatus shown in FIG. 1 may be used to install a liner tube into a conduit extending from a manhole.
Figure 3:
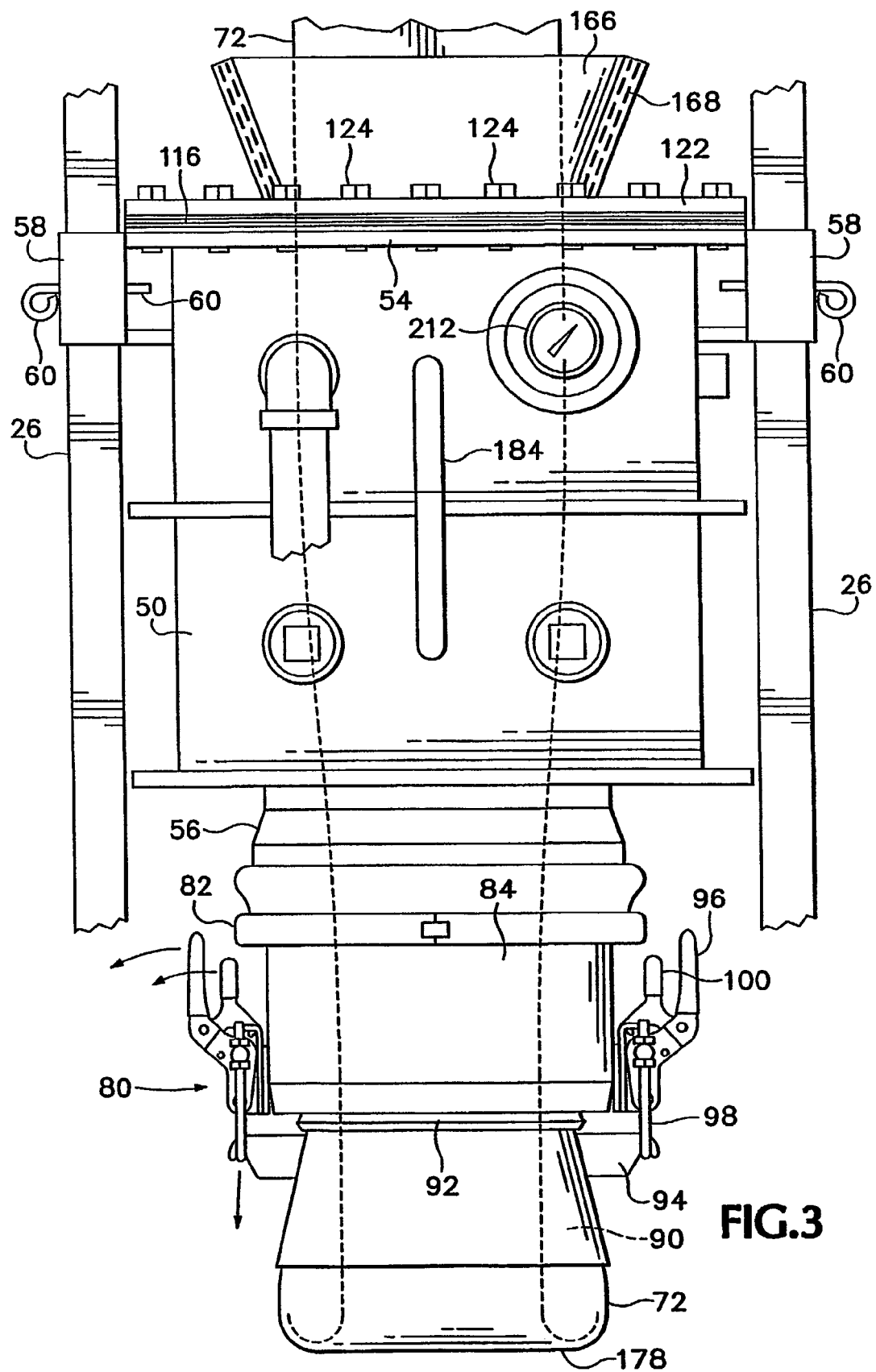
FIG. 3 is a front elevational view of the everter box and its outlet fixture, together with upright portions of the supporting structure shown in FIG. 1.

When the first or near end 92 of the liner 72 is held by the clamp 80 as shown in FIGS. 1–4, with the flattened liner 72 extending into the everter box 50 through the sealing inlet port 106, increasing the fluid pressure, as by introducing compressed air into the interior of the liner everter box 50, will urge the liner 72 out from the container 52 through the outfeed fixture 56 and the appropriately installed attachment clamp 80, with the liner 72 being everted at its furthest extended portion as shown at 178 in FIGS. 2, 3 and 4. Fluid pressure within the interior of the liner everter 50 in excess of ambient air pressure will also urge the lips 112 and 114 toward each other and into contact with the portion of the liner 72 extending into the liner everter box 50 through the sealing port 106, preventing escape of the compressed air or other fluid under pressure from inside the liner everter box 50, yet permitting the liner 72 to slip between the lips 112 and 114 on its way into the everter box 50 and toward the outfeed fixture 56 at the bottom of the container 52. Preferably, as shown in FIG. 2, where a conduit 179 to be repaired extends away from one side of a manhole 180 whose base is wider than the opening at ground level, the liner 72 will extend at an angle of inclination with respect to the vertical, and the liner receiver 50 is able to tilt somewhat to accommodate that path of the everted liner 72.

Once the entire length of the liner 72 has passed through the sealing port 106 into the liner everter box 50, a tail rope 182 attached to the tail, or far end of the liner 72 can also be allowed to pass into the liner everter 50 through the sealing inlet port 106, which will also create a sealing closure around the tail rope 182. Tension can be maintained in the tail rope to control the speed at which the liner 72 is carried along the interior of the conduit 179 as it continues to be everted within the conduit. Such control is desirable to assure that the liner 72 is subjected to sufficient pressure while eversion within the conduit is allowed to take place. The tail rope 182 may be extended around one of the rollers 68 and 74 and allowed to slip at the desired speed around a cleat 184 located on the exterior of the liner receiver box.

Once the liner 72 has been everted completely to the far end of the section of conduit 179 being repaired, the far end of the liner 72 can be sealed and contained as necessary to maintain pressure within the liner 72 and permit heat to be provided to the interior of the liner 72 in the conduit 179 to commence the curing of the resin. Depending on how heat is intended to be applied to the interior of the conduit with the everted liner in place, it may also be desirable to utilize the tail rope 182 to pull a lay-flat hose 186 toward the far end of the everted liner 72 so that hot water, steam, or heated air can be carried through the lay-flat hose 186 to the far end of the section of conduit being repaired. Such a lay-flat hose 186 may also be moved through the sealing port 106 together with the tail rope 182.

Referring now to FIGS. 11–15, a sealing port 190 is of slightly different construction from that of the previously described sealing port 106. The sealing port 190 is used by being installed in the same manner as the sealing inlet port 106, between the flanges 54 and the cover plate 122, shutters 170 and end plates 176, and is also similarly supported by attachment to the flange 54 using the bolts 162. A base portion 192 is of multilayered construction including a top sheet 194 of felt with an adhered plastic film as described above. A slot 196 defined in the top sheet 194 is diamond-shaped, wider at midlength than at its ends, and may include circular stress-relief portions at each end and in the middle to make tearing of the material less likely. A bottom sheet 198 of elastic rubber-like material such as a silicone rubber material about 1/8 inch thick includes a slit 200 also having stress relieving circular openings at its ends. A lower intermediate layer 202 includes a pair of separate sheets 202a and 202b, each located on a respective side of the slit 200 and each including a respective lip portion 204a, 204b, extending downward through the slit 200. The separate parts 202a and 202b of the lower intermediate layer are of a flexible, strong, and fairly thick material such as the previously described felt material commonly used as the material of the tubular liners 72 and which includes an adhered layer of a polymeric plastic material such as 10–15 mil polyurethane film on the upper side of the lower intermediate sheet pal. An upper intermediate sheet 206 is of a low-friction polymeric plastic material such as PTFE in two parts 206a and 206b, shaped similarly to the parts 202a and 202b, and may be 1/32 inch to 1/16 inch thick. Lip portions 205a and 205b are included and extend though the slit 200 overlying the lip portions 204a, 204b. The top sheet 194 is also of such felt with an attached film of polymeric plastic. The several layers of the base portion 192 are stitched together, and the ends 207 of the lips 204a, 204b, 205a, 205b, are also stitched together, keeping the lips aligned with each other, and the lips are also supported and resiliently urged together by the bottom sheet 198, as seen best in FIG. 14.

Figure 14:
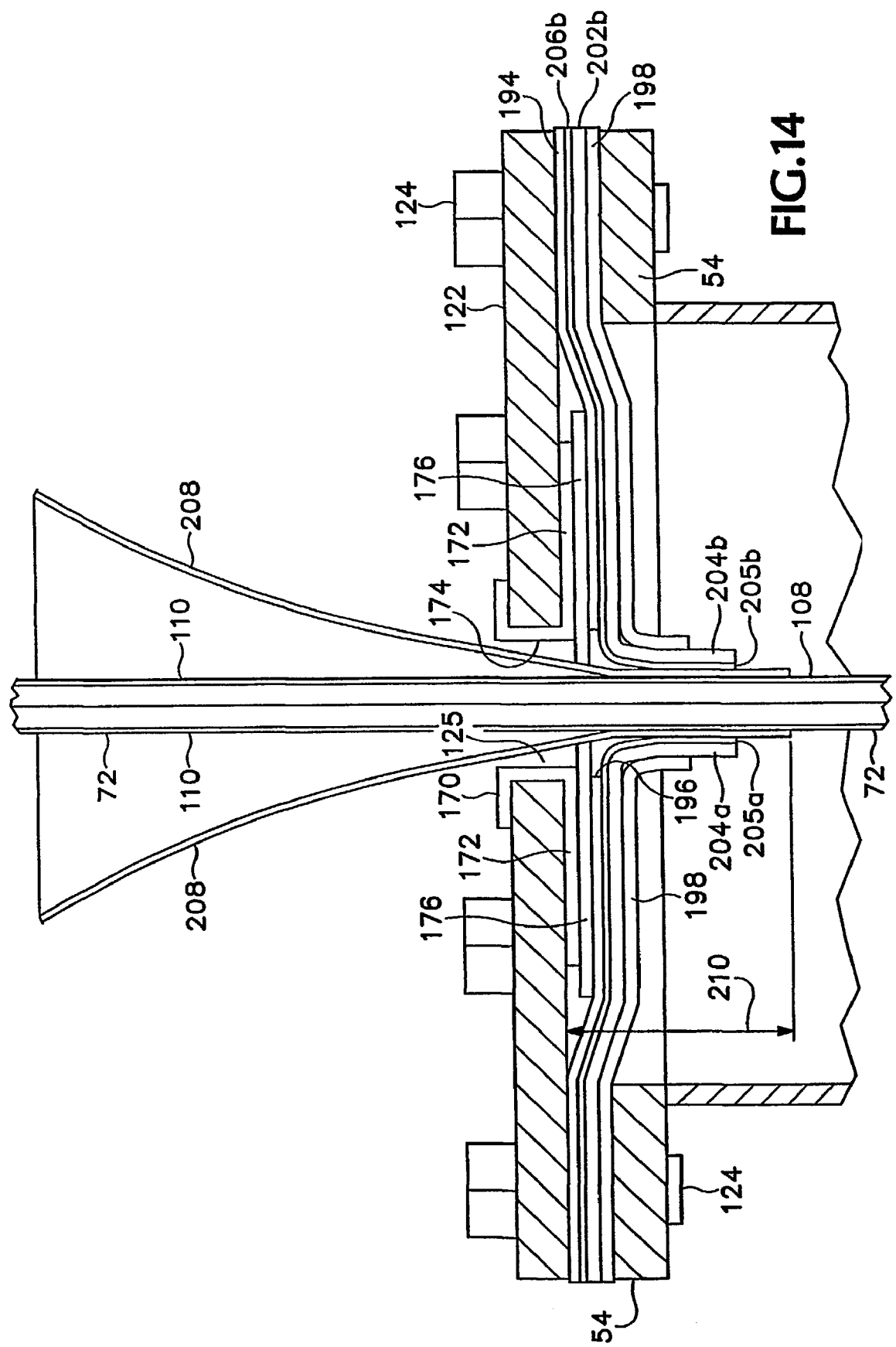
FIG. 14 is a sectional view, taken along line 14—14 of FIG. 11, showing the inlet seal shown in FIG. 12 installed in the upper end of the everter box, together with the liner-guiding assembly.
Figure 15:
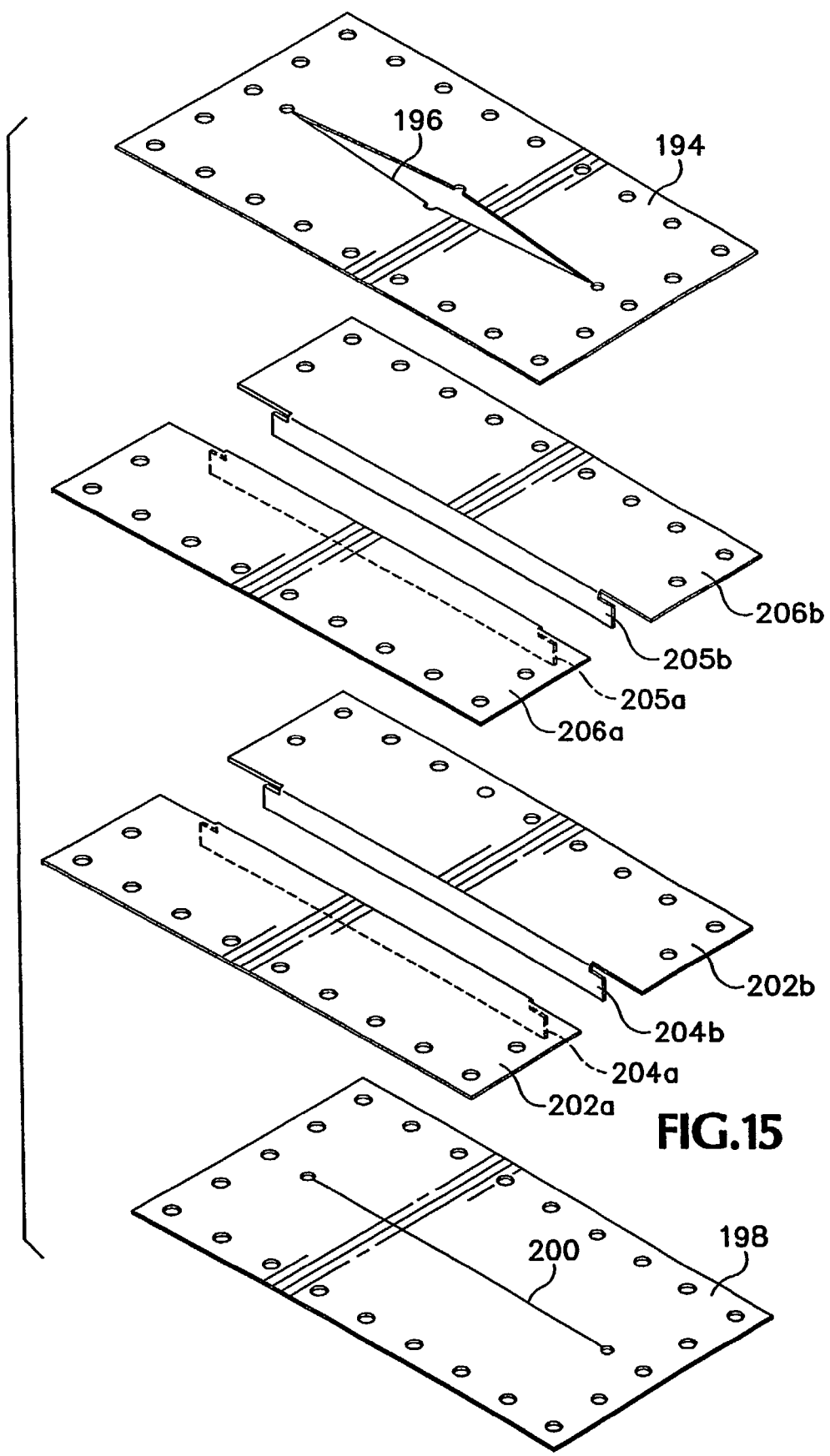
FIG. 15 is an exploded isometric view of the inlet seal assembly shown in FIGS. 12, 13 and 14.

A pair of fan-shaped guiding members 208 of low-friction plastic sheet material such as PTFE material, similar to the guiding members 166, extend above the cover plate 122 and also extend into the container 52 between the lip portions 204a and 204b, preferably extending into the interior of the container 52 to a distance 210 extending beyond the bottom margins of the lips 204a, 204b, as shown in FIG. 14.

Instead of assembling the parts of the sealing inlet port 190 as just described, it would also be possible to mold in combination a base and a pair of sealing lips of a suitable rubber or rubber-like plastic material of appropriate flexibility and hardness to be pressed sealingly against a liner tube 72 and an associated tail rope 182 and lay-flat hose 186.

Various connector fittings are provided on the walls of the liner everter box 50 to accept hoses or pipes as necessary to deliver compressed air, steam, or water to the interior of the container 52 to fill the liner 72 and thus force it to evert itself and extend into a conduit being repaired using the apparatus 16 of the invention. A pressure gauge 212 is also provided, preferably protected by an appropriate shield to prevent damage during use of the apparatus. It will be understood that various valves will also be necessary to control the amount of air, steam, or water delivered to the liner receiver 50.

Ordinarily, the pressure required within the container 52 to extend and evert a liner 72 for a conduit being repaired with a nominal inside diameter of eight inches, using a double thickness felt liner, will be within a range of about 15 psi to 30 psi, preferably being about 10 psi. Since the pressure is fairly low, then, the lips 112, 114 of the sealing inlet port 106 must be flexible enough to conform to the liner 72 as it passes through the port into the interior of the liner everter 50, to prevent excessive leakage. It will be understood, however, that some leakage will still be acceptable and is unavoidable.

Figure 16:
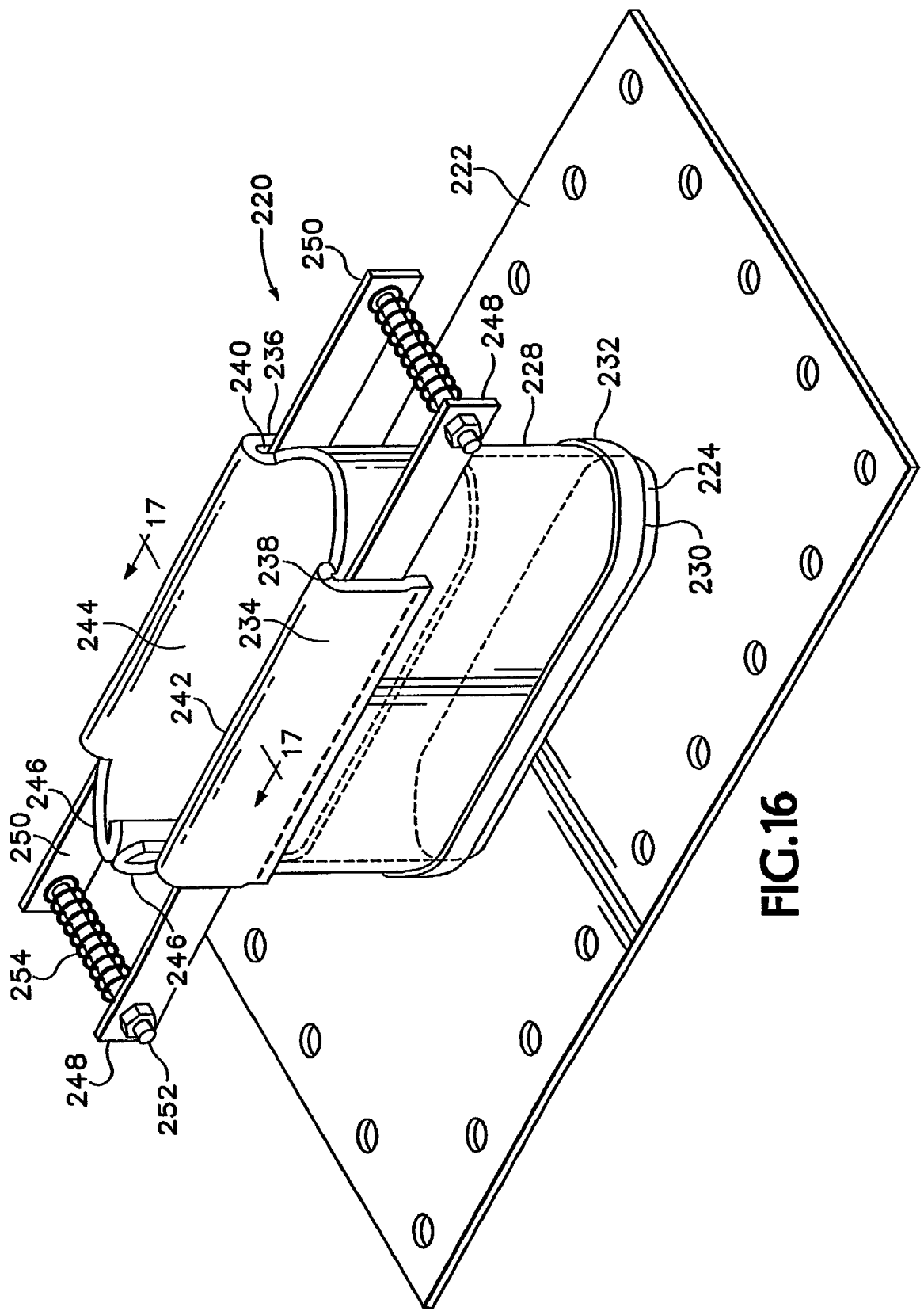
FIG. 16 is an isometric view of a sealing inlet port that is another embodiment of the invention, shown inverted.
Figure 17:
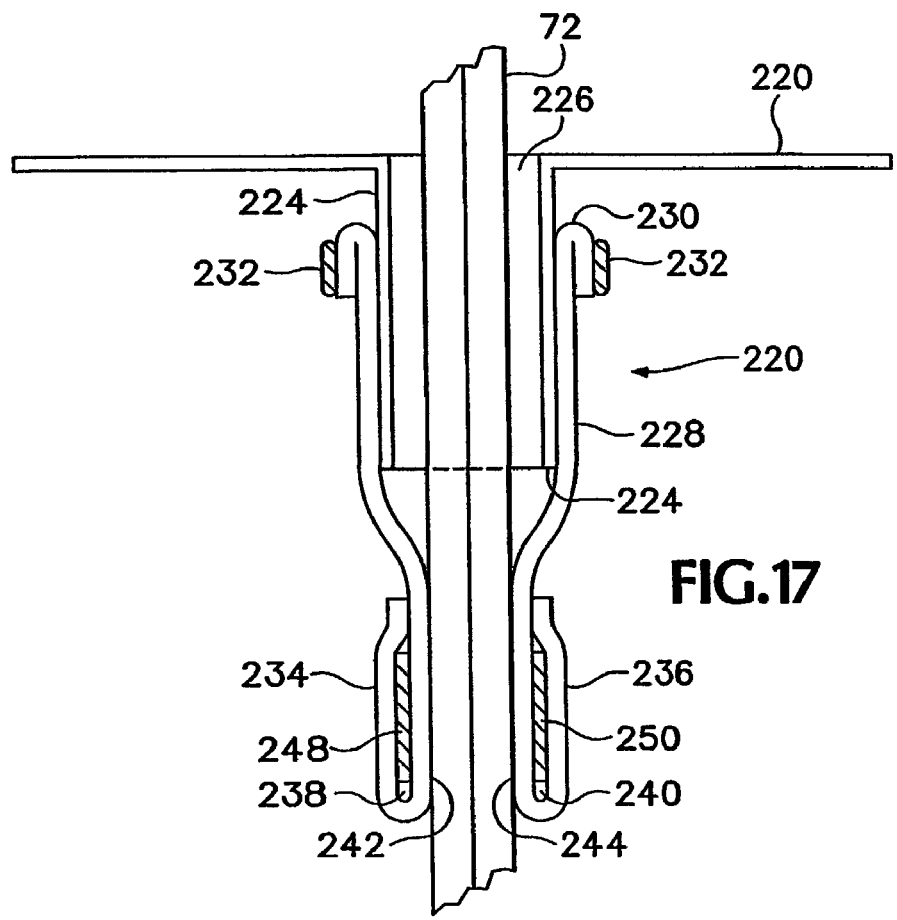
FIG. 17 is a section view, taken on line 17—17 of FIG. 16, showing the inlet port in its actual orientation as when in use.

Referring now to FIGS. 16 and 17, a sealing inlet port 220 is shown in FIG. 16 inverted from its normal orientation at the top of a liner everter container 52. The sealing inlet port 220 includes a base portion 222 which may be of sheet aluminum, shaped and perforated to fit atop the flange 54, together with an appropriate gasket (not shown). It will be apparent that with appropriate spacers and gaskets (not shown), the cover plate 122 and the shutter assembly 169 can be used together with the sealing port 220, as could the guiding members 166.

Extending from the base plate 222 is a support tube 224 which may be of a modified oval shape and which is welded to the base plate 222 along the margin of a similarly-shaped mouth 226. Fitted snugly around the support tube 224 is a sleeve 228 of flexible sheet material, which may be material similar to that of which the liner 72 is constructed. A base margin 230 of the sleeve is fastened to the support tube 224, as by a suitably tensioned hose clamp 232. At the opposite end of the sleeve 228 a pair of flaps 234 and 236 are folded back along the outside of the sleeve 228 and stitched to the material of the sleeve to form a pair of tubes 238, 240, each extending alongside a respective lip 242, 244. Overlying margins 246 of the material of which the sleeve 228 is made may be sewn together to form the sleeve after the flaps 234, 236 have been sewn to form the tubes 238, 240.

Supporting members 248, 250 extend respectively through the tubes 238 and 240. The supporting members 248 and 250 may be similar to the supporting members 148, 150 described above, and are interconnected with each other similarly by fasteners such as bolt-and-nut combinations 252 extending through respective bores defined in the supporting members 248, 250. Compression springs 254 are fitted around the bolts 252 and serve to urge the supporting members apart from each other in the manner previously described to prevent the lips 242, 244 from pressing against a liner tube with too much pressure and thereby causing excessive friction.

Figure 18:
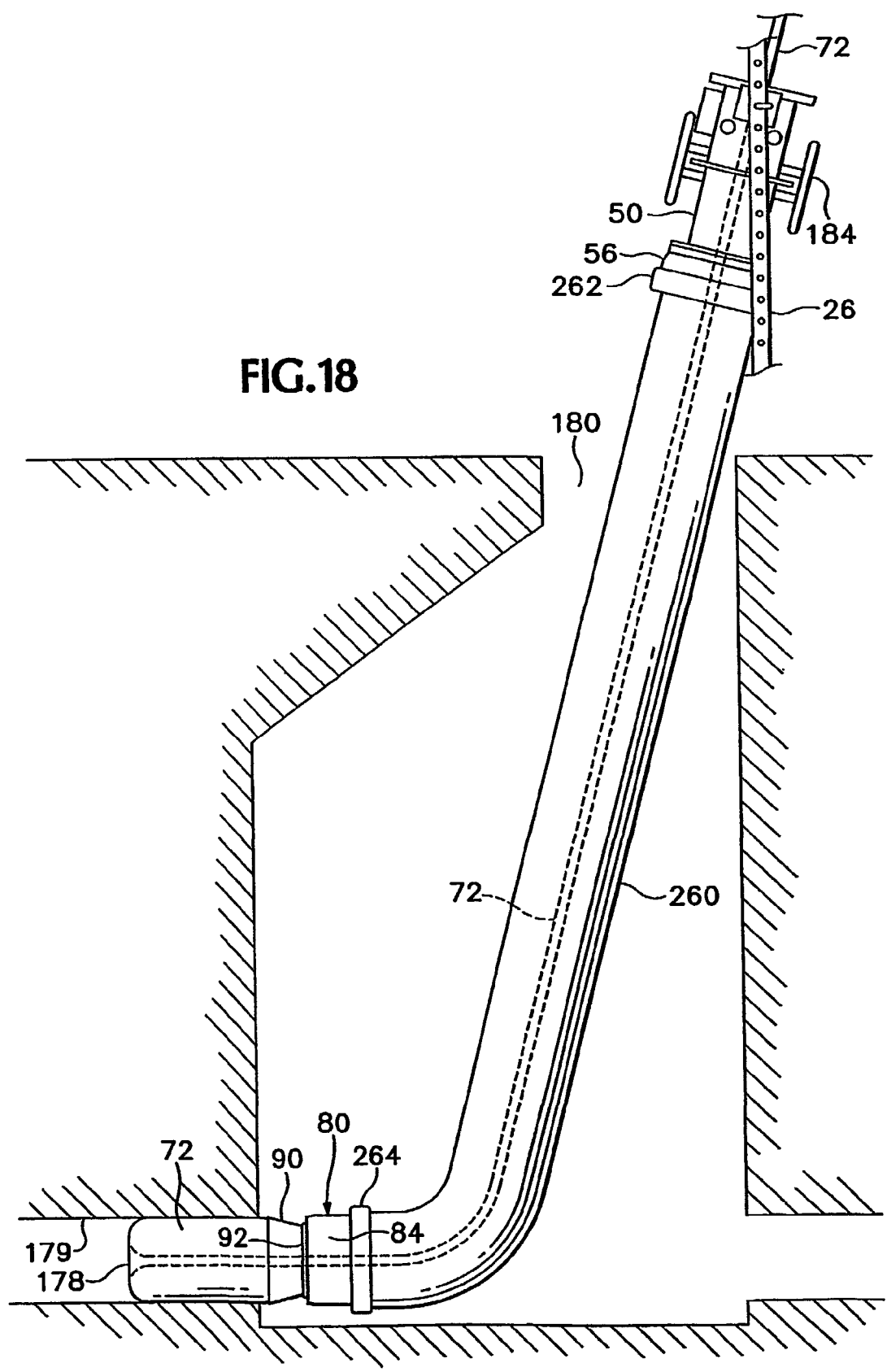
FIG. 18 is a semi-diagrammatic representation of apparatus which is another embodiment of the invention, showing its use in installing a liner tube into a subterranean conduit.
Figure 20:
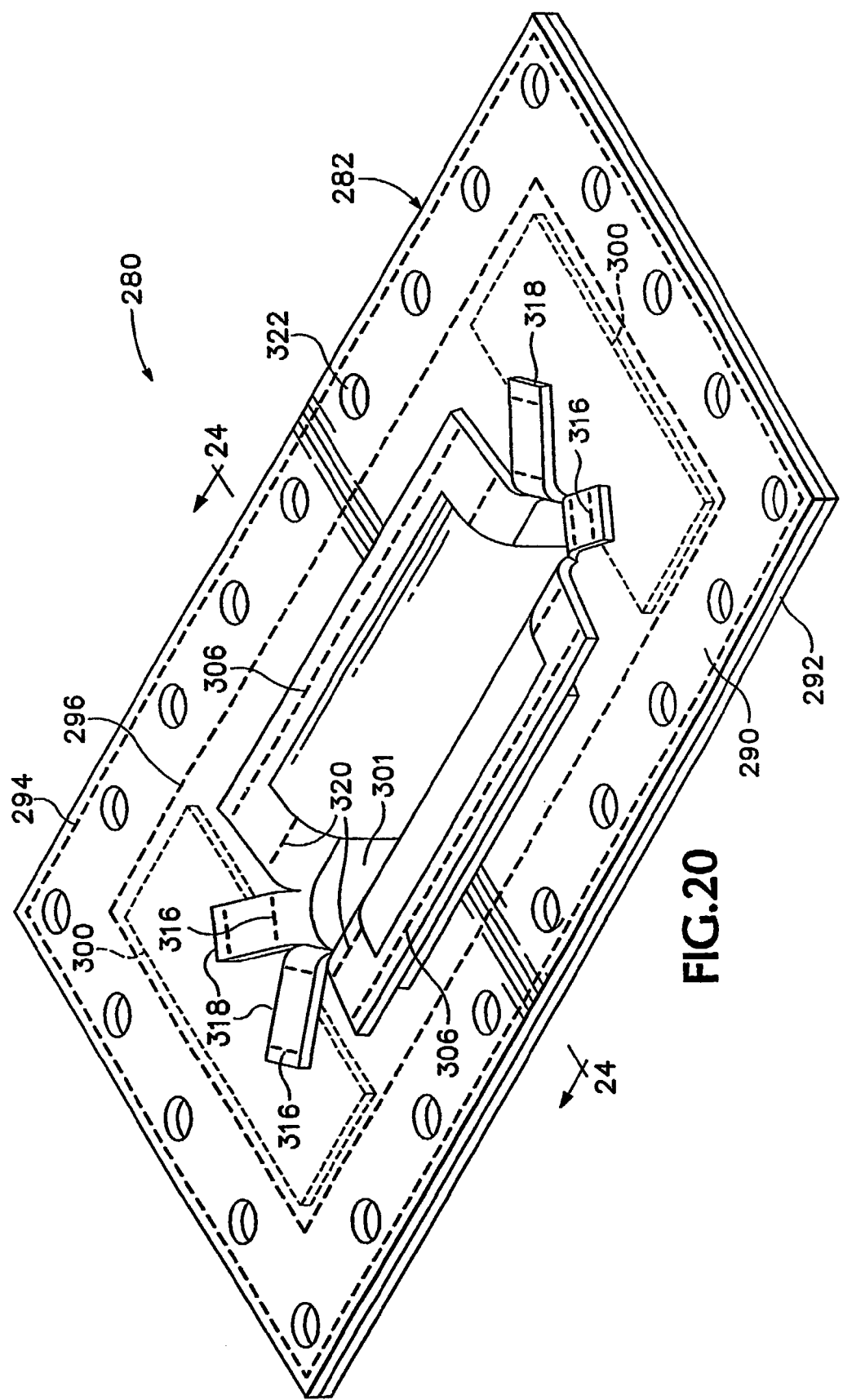
FIG. 20 is an isometric view of the upper, or inlet, side of a base sheet assembly and accompanying sealing lips of a sealing inlet port which is a further embodiment of one aspect of the present invention.

As shown in FIG. 18, in one embodiment of the invention a flexible tubular conduit 260 is attached to the outfeed fixture 56 by a coupling 262, and the attachment clamp 80 is attached to the opposite end of the flexible conduit 260 by a coupling 264, so that the rear end 92 of the liner 72 may be held by the attachment clamp 80 at a location more immediately adjacent to the conduit 179 which is to be repaired by insertion of the liner 72. The flexible conduit 260 may be of any flexible substantially airtight material capable of withstanding the pressures and temperatures utilized in extending and everting the liner 72, such as material similar to that of which the liner 72 may be constructed, that is, strong felt with a coating of polyurethane to make the material airtight. Use of the flexible conduit 260 between the liner everter container 52 and the open end of the conduit 179 saves the expense of preparation of a length of liner material equal to the length of the conduit 260 and saves the expense of treating such a section of liner material with the required resin. Utilization of the liner everter box 50 with the flexible conduit 260 attached is the same as with the near end 92 attached to the attachment clamp 80 immediately adjacent to the outfeed fixture 56, except that the near end 92 of the liner 72 first needs to be pulled through the flexible conduit 260 and then attached to the attachment clamp 80.

Figure 19:
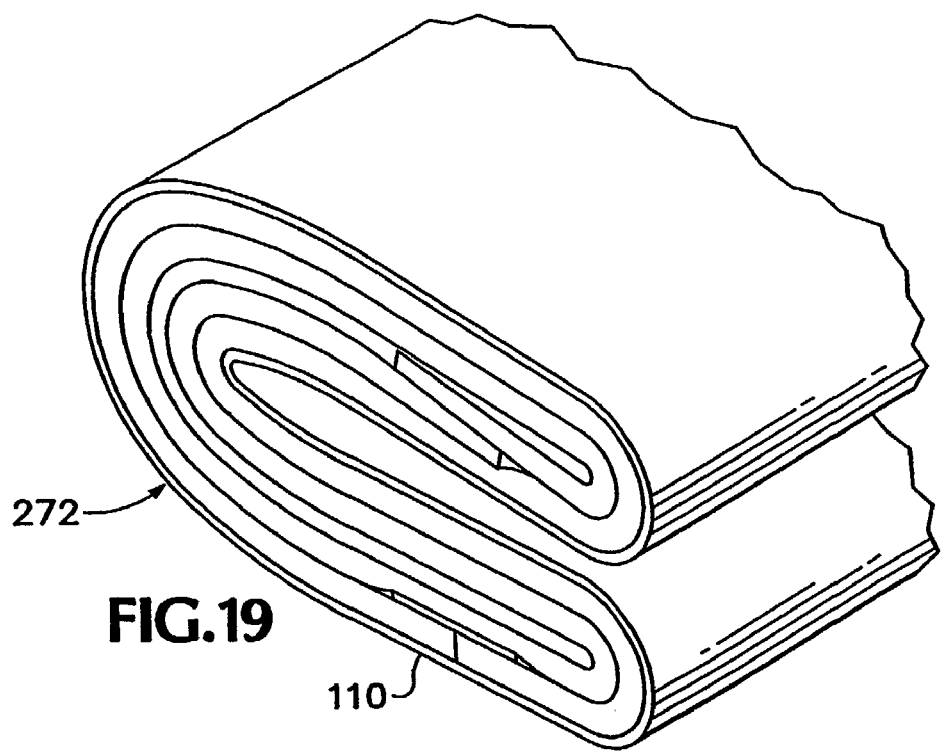
FIG. 19 is an isometric end view of a tubular liner in a folded configuration.

When utilizing the apparatus of the present invention for installation of a liner tube 72 for a conduit being repaired which is of a smaller inside diameter, such as 6–10 inches, the liner tube 72 may be folded flat as shown in FIGS. 1–4. Instead, and particularly for repair of larger conduits, such as 12 inches and larger in diameter, utilizing the apparatus of the present invention, a liner 272 may be folded into a "U" or flattened "C" configuration as shown in FIG. 19. This configuration presents significantly less outer surface upon which the lips of the sealing inlet port 106 or 190 or 220 are brought to bear frictionally by the pressure of fluid contained within the liner everter container 52 so that the liner 272, exposes less surface to the lips and can slide through the sealing inlet port with less friction. The liner 272 can thus be extended and everted without having to increase the pressure on the fluid within the liner everter container 52 more than is desirable.

The apparatus described enables a liner 72 or 272 to be extended and everted by use of air pressure within the liner everter container and the portions of a liner which have been extended and everted, as will be desirable in most cases. In the installation of larger sizes of liners into conduits being repaired it may also be desirable to use water within the liner during installation to reduce friction between the surfaces of the moving portion of the liner against the already-everted portions of the liner within the conduit 179.

Figure 5:
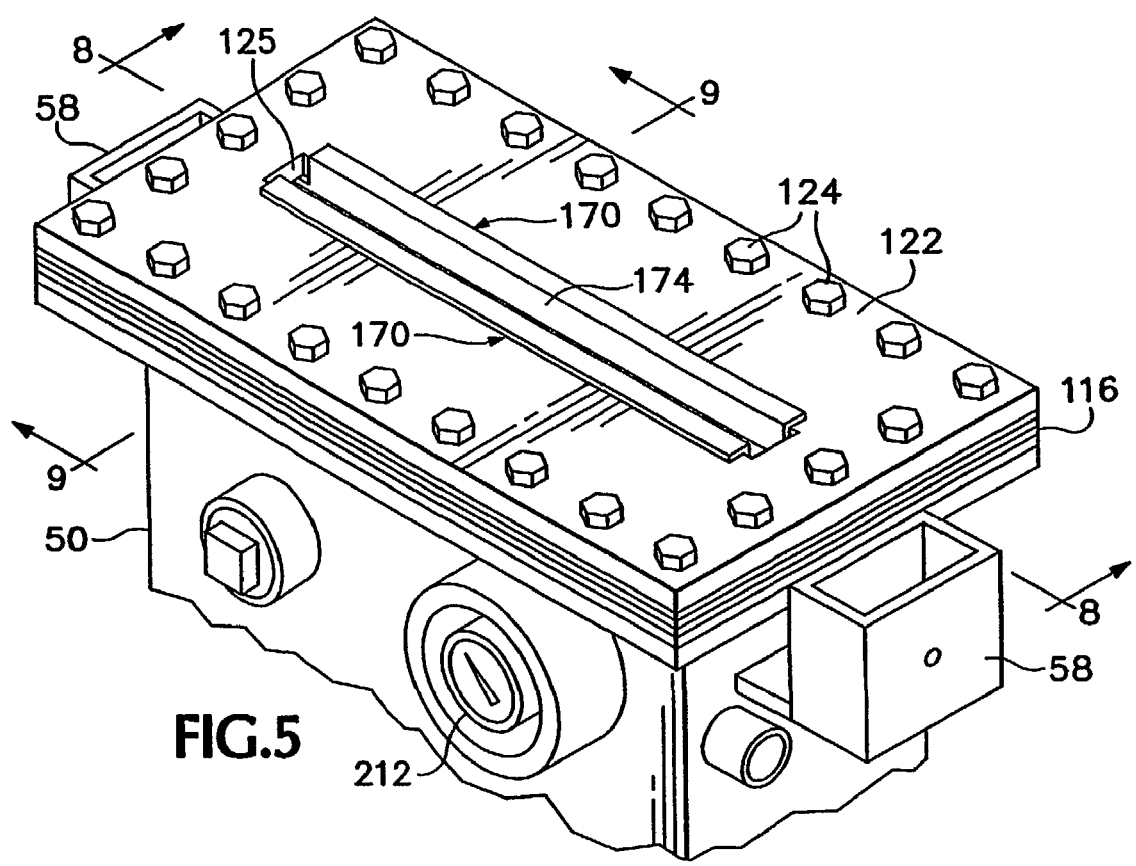
FIG. 5 is an isometric view taken from the upper right front corner of the everter box shown in FIG. 1, at an enlarged scale.
Figure 6:
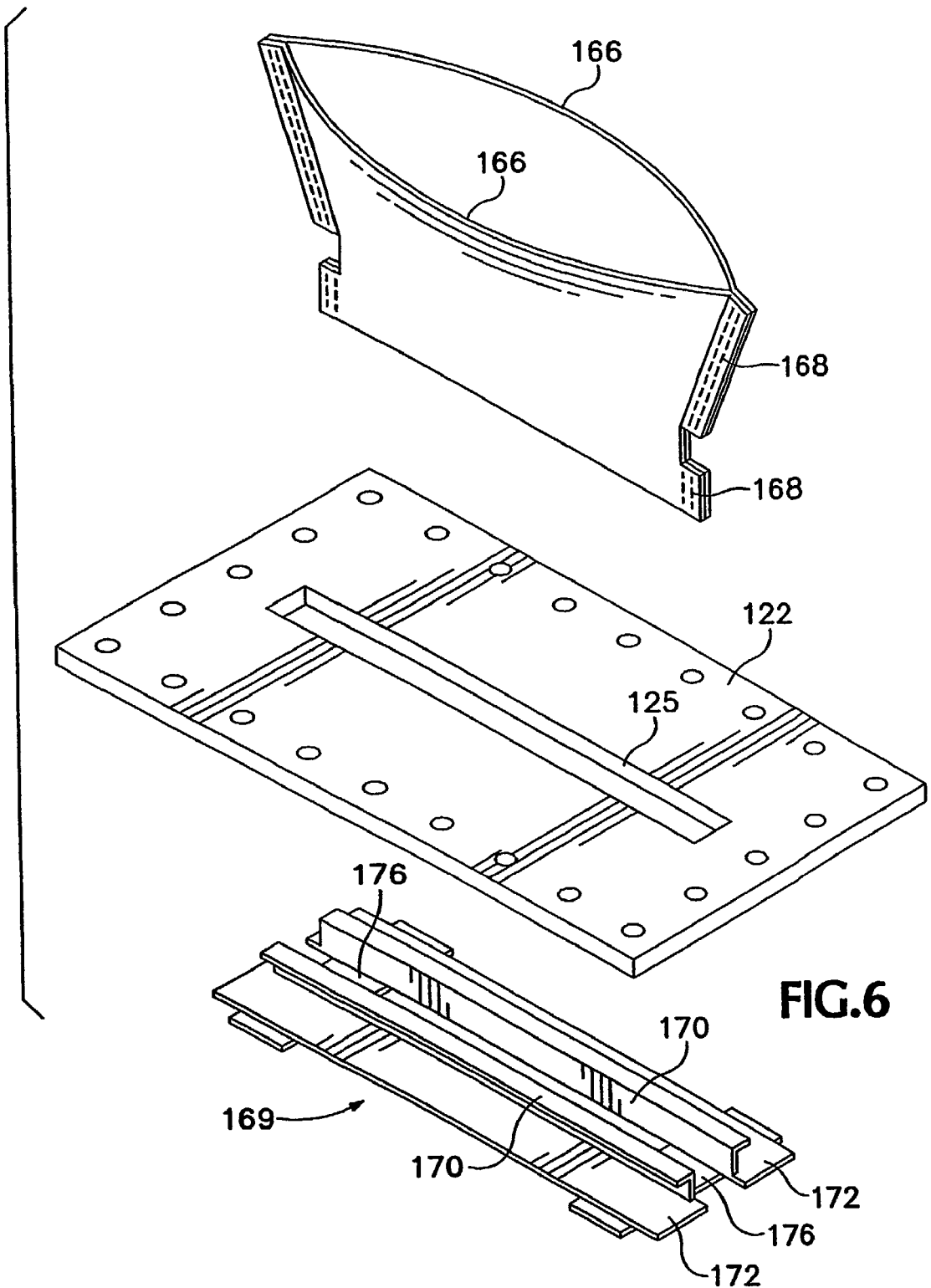
FIG. 6 is an exploded isometric view showing the cover plate, the shutter assembly, and the funnel-like liner-guiding assembly of the everter box shown in FIG. 3.
Figure 7:
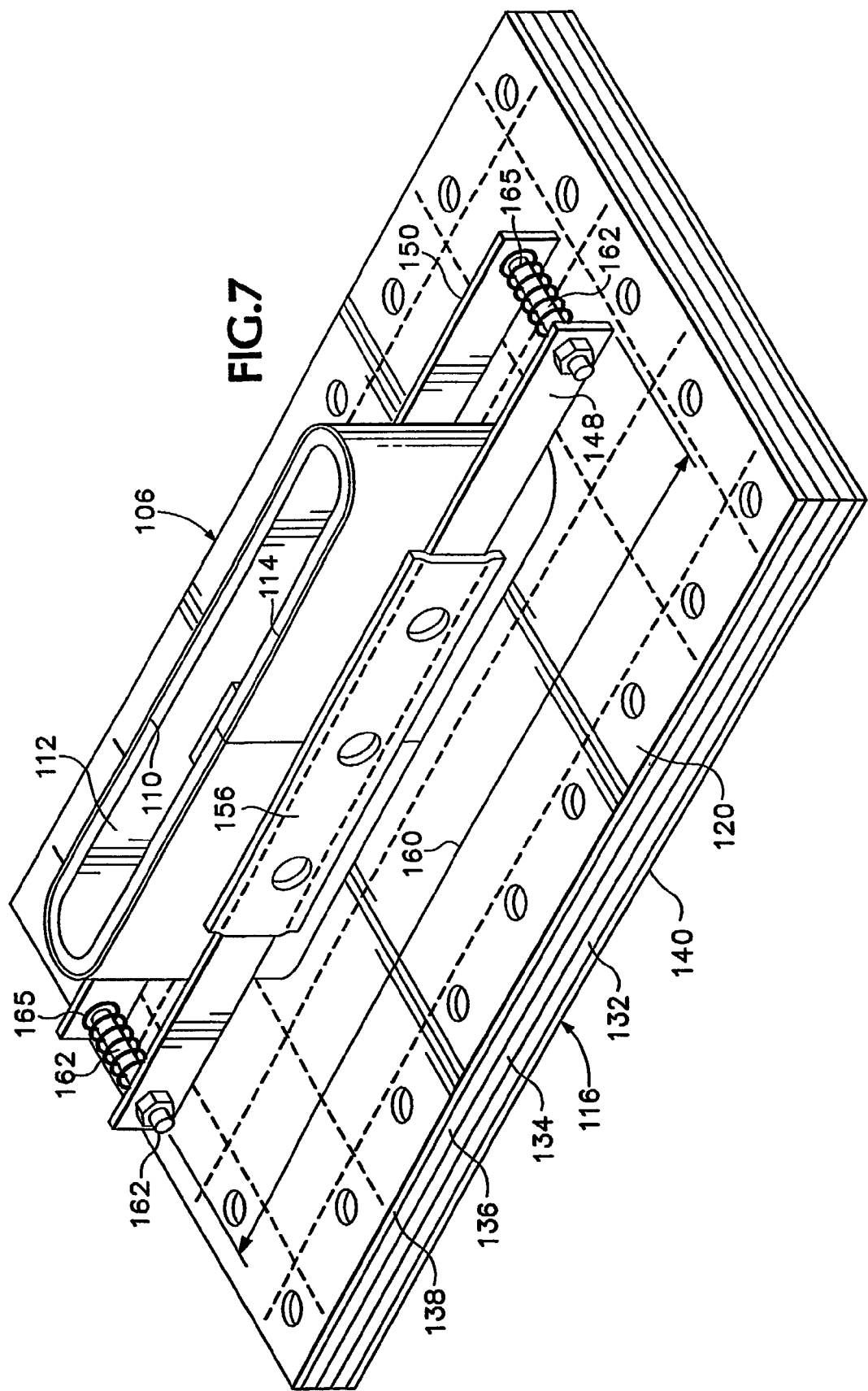
FIG. 7 is an isometric view of a base sheet assembly and associated lips of a sealing inlet port which is one embodiment of the present invention, taken from the bottom, or inner, side of the base.
Figure 8:
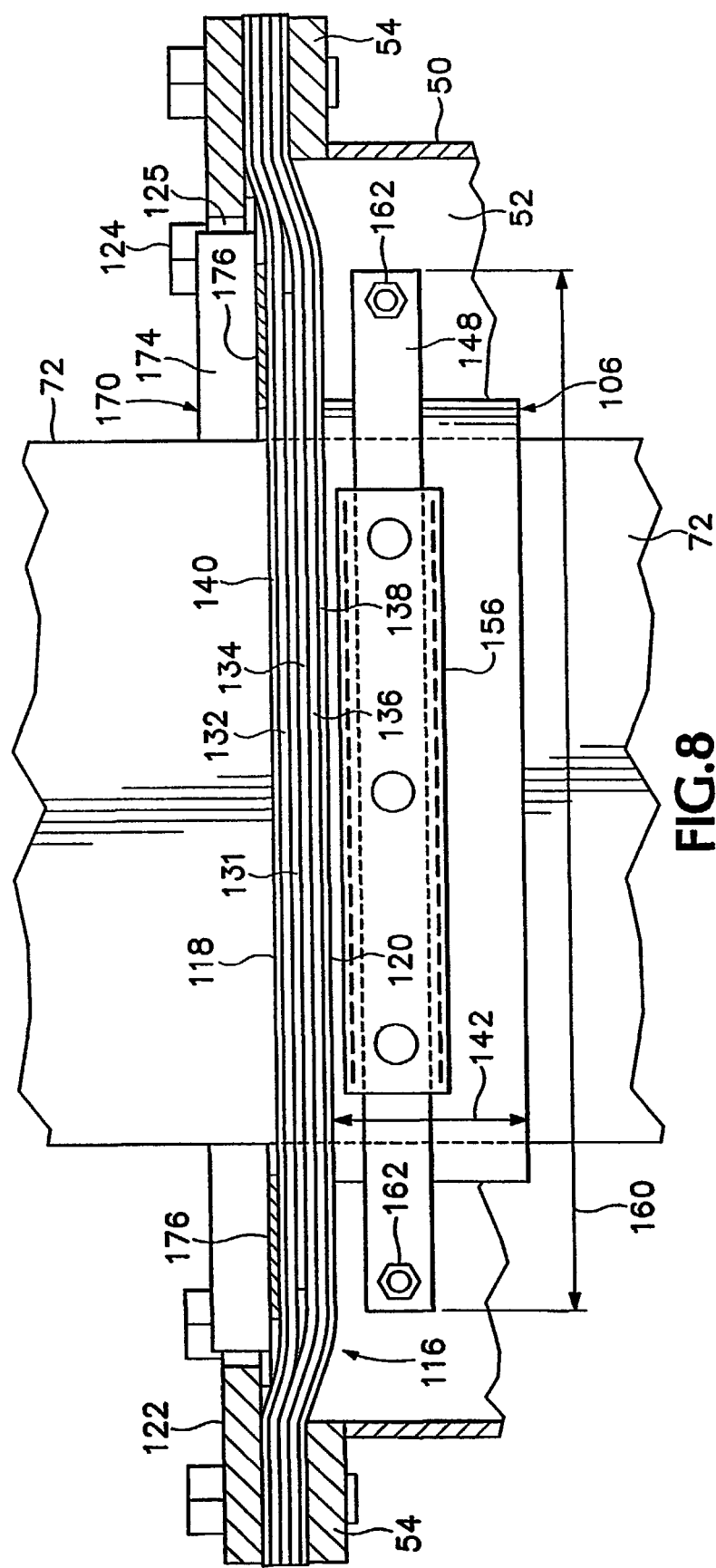
FIG. 8 is a sectional view, taken along line 8—8 in FIG. 5, at an enlarged scale, showing the sealing inlet port and a flattened tubular liner passing into the everter box through the sealing inlet port.

A further alternative embodiment of the sealing inlet port is shown in FIGS. 20, 21, 22, 23 and 24, where a sealing inlet port 280 for use in an everter box such as the liner everter box 50 shown in FIGS. 3 and 5 includes a base sheet assembly 282 supporting a pair of lips 284, 286, which extend through a mouth 288 defined by the base sheet assembly.

The base sheet assembly 282 includes a pair of layers of material such as the polyurethane-coated polyester felt material of which the liner tube 72 is made, although, if desired, the base sheet assembly may be of other strong, somewhat flexible sheet material which is substantially gastight and able to withstand elevated temperatures and pressures. An upper layer 290 and a lower layer 292 are preferably oriented with the polyurethane coated sides of the felt material facing apart from each other.

The lips 284, 286 for the sealing inlet port 280 shown in FIGS. 20–24 are intended to contain the air or other gas under pressure used to evert a tubular liner 72 to repair a conduit which is smaller than the maximum size liner 72 that the everter box 50 is capable of handling, and so the mouth 288 has a length 298 that is shorter than the length of the inlet opening or slot 125 in the cover plate 122 of the everter box 50 (FIG. 5). To reinforce the parts of the base sheet assembly 282 that close parts of the slot 125 beyond the mouth 288, a pair of sheet metal support plates 300 are located between the upper and lower layers 290, 292, as seen best in FIGS. 20 and 21. For a similar sealing port for a tubular liner 72 of the maximum size for the everter box 50 the support plates 300 are unnecessary.

Figure 21:
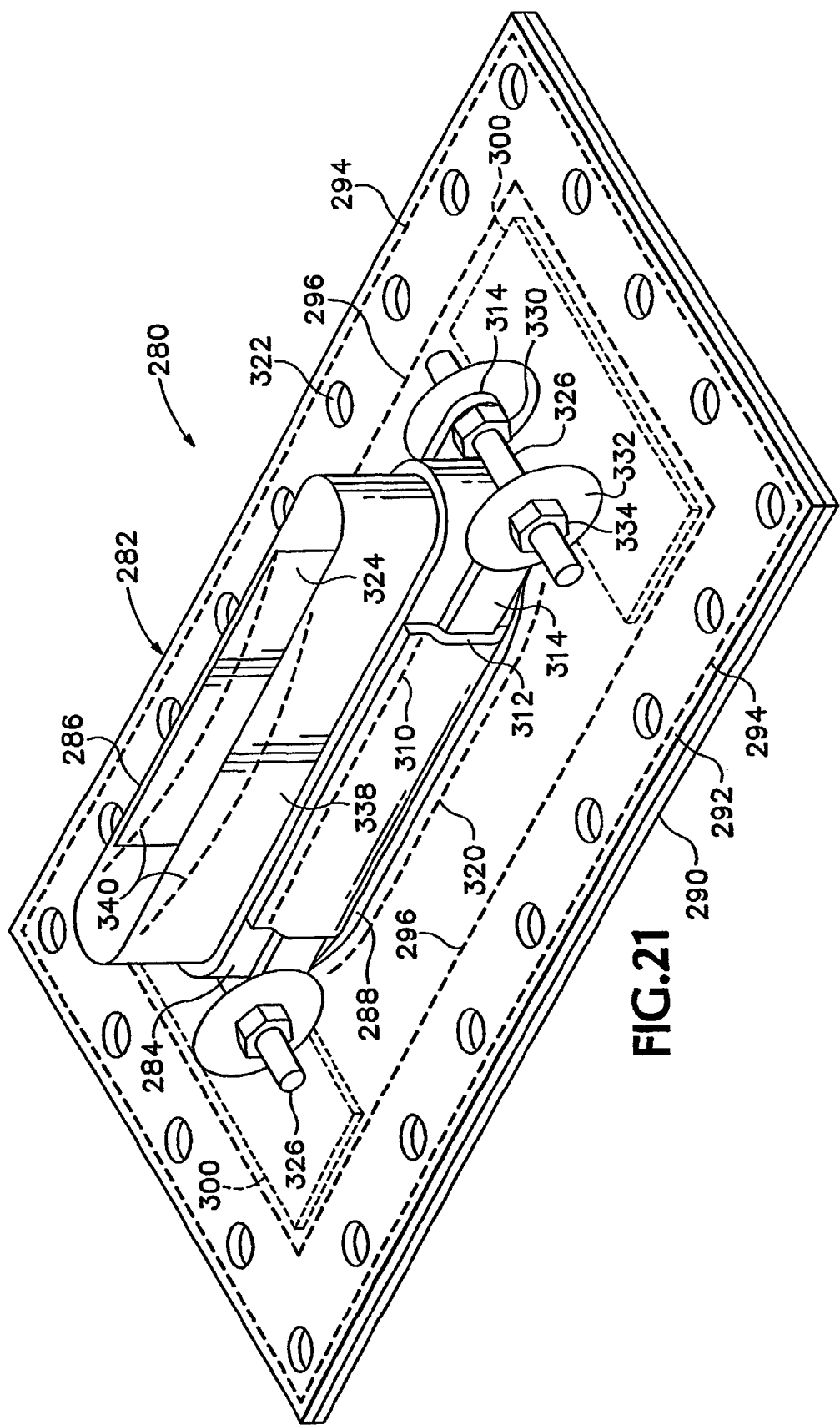
FIG. 21 is an isometric view of the lower, or interior, side of the base sheet assembly and associated sealing lips shown in FIG. 20, showing the lip support assembly and the inner margins of the lips thereof.
Figure 22:
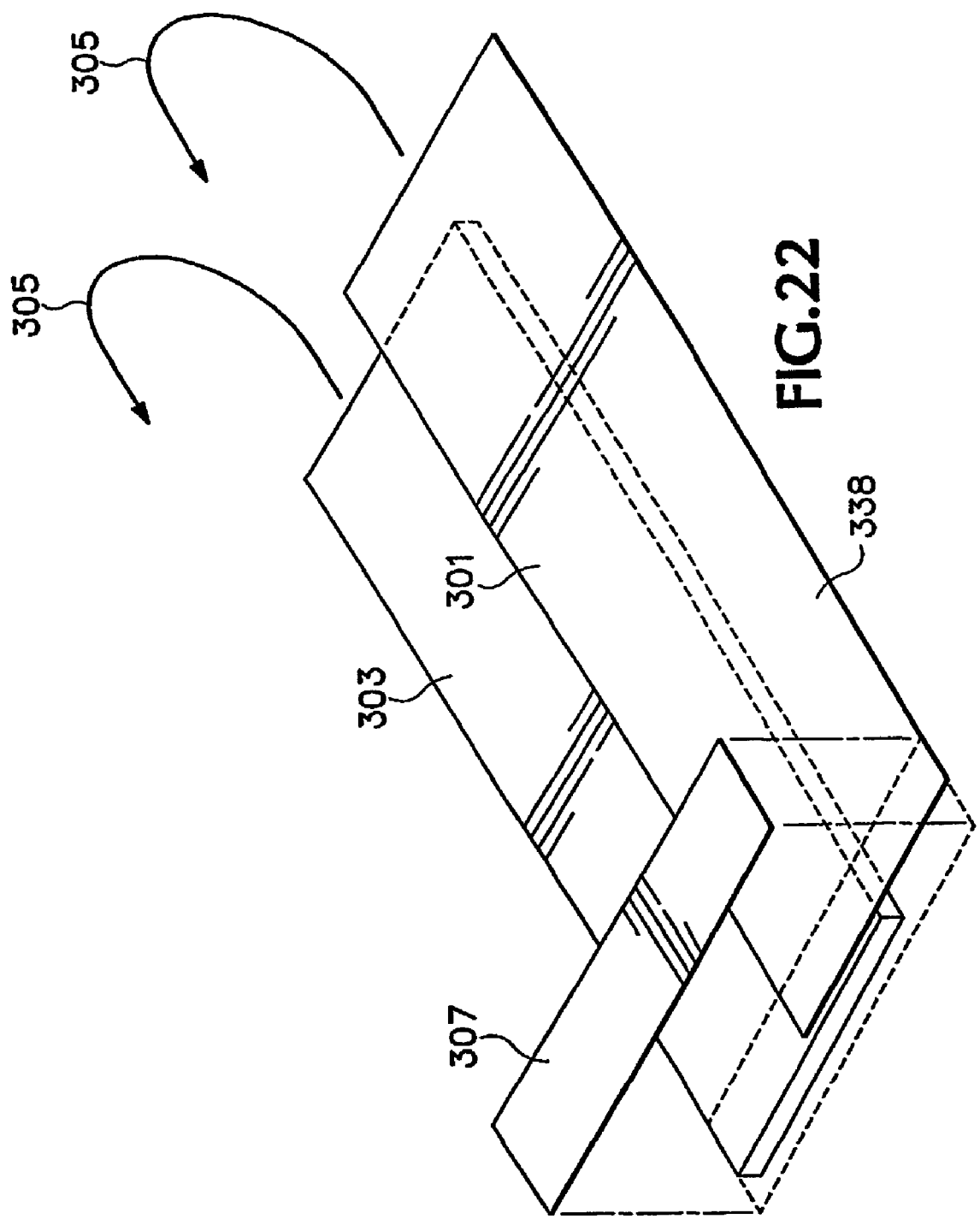
FIG. 22 is an isometric view showing one step in the procedure of assembling the sealing lips for the assembly shown in FIGS. 20 and 21.

The lips 284, 286 are preferably constructed from a strong flexible sheet 303 of material such as the same sort of felt with a coating of polyurethane on one side, although other materials might also suffice. An overlying sheet 301 of a tough, flexible, low-friction material such as polyurethane having a thickness of 20 mils, for example, is adhesively attached on the polyurethane coated side of the felt 303 as shown in FIG. 22. The felt sheet 303 and the overlying polyurethane 301 may then be rolled inward as indicated by the arrows 305 and formed into a flattened tube with the polyurethane sheet 301 facing inward, as may be seen best in FIGS. 21, 23, and 24. Edges of the felt material 303 are attached to each other adhesively at 302, and a portion of the sheet 301 of polyurethane is overlapped and adhesively fastened. The polyurethane coating and the sheet 301 are thus the inner faces of the lips 284, 186. A strip 307 of polyurethane is also adhered to the polyurethane sheet 301 and to the polyurethane coating of the felt 303, along the butt joint 302.

Alternatively, the connected sheets 303 and 301 may be formed into a tube with the bare felt side of the sheet 303 facing inward so that a lubricant may be absorbed in the felt and act on a liner 72 passing through the sealing port 280.

Figure 24:
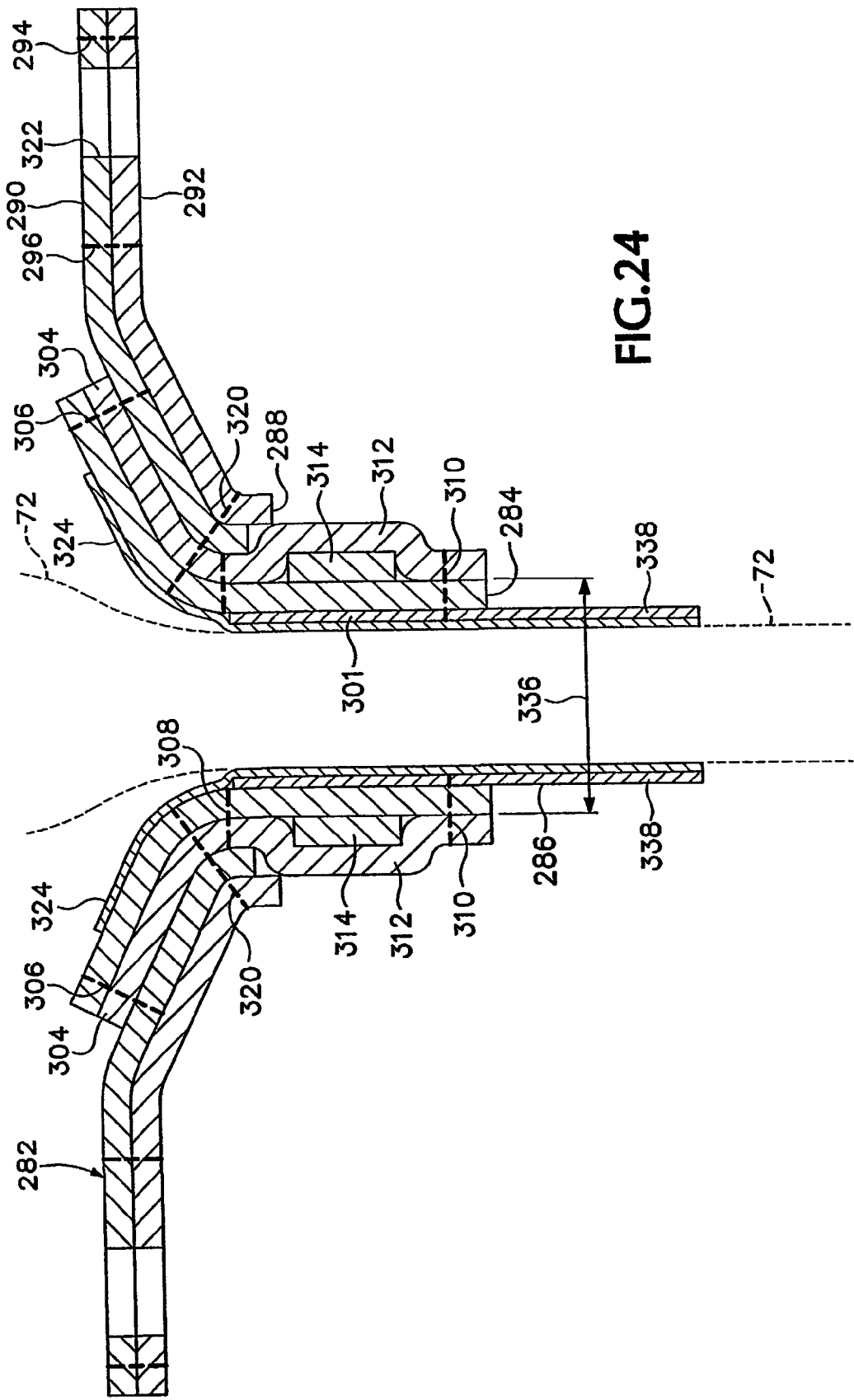
FIG. 24 is a section view of the base sheet assembly and sealing lips shown in FIG. 20, taken along line 24—24 thereof, at an enlarged scale.

Two rectangular pieces 304, preferably of similar coated felt material, are then sewn to the sheet material 303 along median seams 308 and lower edge seams 310, as may be seen best in FIG. 24, on the exterior side of the flattened tube. One of the pieces 304 bridges the butt joint 302. Enough material of the pieces 304 is provided between the median seam 308 and the lower edge seam 310 to form outwardly protruding tubes 312, each of which is to hold one of a pair of supporting members 314 alongside the materials of the flattened tube, as shown in FIGS. 21 and 24. The supporting members 314 are preferably metal bars, although other suitably strong material substantially stiffer than the felt could also be used.

The upper portion of the felt material 303 of the flattened tube forming the lips 284 and 286 is cut and flared outward and sewn to the upper layer 290 of the base sheet assembly in a pair of upper seams 306 spaced outwardly apart from each side of the mouth 288. Short seams 316 are used to sew the tabs 318 thus formed to the upper layer 290, and a suitable sealant such as a silicone caulking material may be installed along the margin of the mouth 288 in the upper layer 290 of the base assembly. Thereafter the lower base layer 292 is placed over the assembled parts, the support plates 300 are put in place, and the uncovered felt surfaces of the layers 290, 292, are fastened to each other using an adhesive or by flame bonding, with the central portions of the upper and lower sheets 290, 292 flexed downwardly as shown best in FIG. 24. A seam 320 is sewn through the upper and lower layers 290, 292 of the base sheet assembly, the material of the flattened tube forming the lips 284, 286, and the pieces 304, along the upper margin of each lip 284, 286, as shown in FIG. 24. Peripheral seams 294 and 296 are then sewn. Bolt holes 322 are cut and the layers 290, 292 are trimmed to size. For less friction during use, a patch 324 of thin PTFE sheet material may be fastened by an adhesive to each of the confronting faces of the lips 284, 286, as seen best in FIGS. 20, 23, and 24.

Thereafter, the supporting members 314, or bars, are inserted through the tubes 312 on each of the lips 284, 286 and fasteners such as the threaded rods or stud bolts 326 are placed through the holes 328 located near each end of each of the bars, with two nuts 330 threaded onto the studs 326 between the bars 314. A suitable radially-extending spacer, such as a large fender washer 332, is placed on each end of each stud 326 and followed by another nut 334. The nuts 330 and 334 are tightened on each side of the bar and spacer combination to adjustably establish the separation distance 336 between the two bars 314 (FIG. 24). A single spacer (not shown) or a spring such as the springs 165 might also be used, but the nuts 330, 334 provide both adjustability and a fixed spacing 336. The supporting members 314 are preferably kept parallel and spaced apart from each other, at a separation distance 336 small enough to permit the confronting inner faces of the lips 284, 286, and particularly the lower end polyurethane sheet flexible skirt portion 338 of each of the lips, to be pressed against the surfaces of a liner tube 72 being everted through the sealing port assembly 280.

The spacers 332 keep the bars 314 located in a position spaced far enough inwardly beneath the lower layer 292 of sheet material of the base sheet assembly 282. This helps keep the central portion of the base sheet assembly 282, adjacent the mouth 288, stretched downward in a shallow V configuration as shown best in FIG. 24, helping to guide the tubular liner 72 toward and through the mouth 288 and lips 284 and 286, particularly should a bubble develop in the flattened liner tube outside the everter box 50. The spacers 332 and bars 314 also prevent pressure within the everter box 50 from forcing the lips 284, 286 to fold upwardly and out through the mouth 288. As the bars 314 extend beyond the length 298 of the mouth 288 they cannot pass through the mouth, and they keep the lips 284, 286 on the inner side of the base sheet assembly 282. Each tube 312 is shorter than the lip 284 or 286 to which it is attached, so that the interconnected ends of the lips are free to flex to provide an effective seal against the surface of the fold in the flattened liner 72.

The spacing between the bars 314 is preferably adjusted to a distance slightly greater, for example, 20 mm more, than the pinch roller gap setting used in impregnating the liner material with uncured resin. This spacing 336 should be tightened if the lips 284, 286 tend to flutter or the lower skirt portion 338 tends to be reversed and blown outward alongside the liner tube 72 being drawn into the everter box through the sealing inlet port 280. If there appears to be too much friction the separation distance 336 should be increased.

If desired, the lower or skirt portion 338 of the lips 284, 286 may be trimmed shorter to reduce the amount of frictional drag, although that results in less efficient sealing. Alternatively, the central part of the skirt portion of each lip may be cut in a curved shape as indicated in broken line at 340 in FIG. 21 so that the interconnecting end portions provide a better seal along the fold on each side of the flattened liner tube while friction is reduced somewhat.

While the sheets 324 of PTFE are provided to reduce friction, a spray nozzle should also be used continually during eversion of a liner tube, to lubricate the surfaces of the liner and the lips 284, 286 in order to promote efficient eversion of a liner tube 72.

Figure 25:
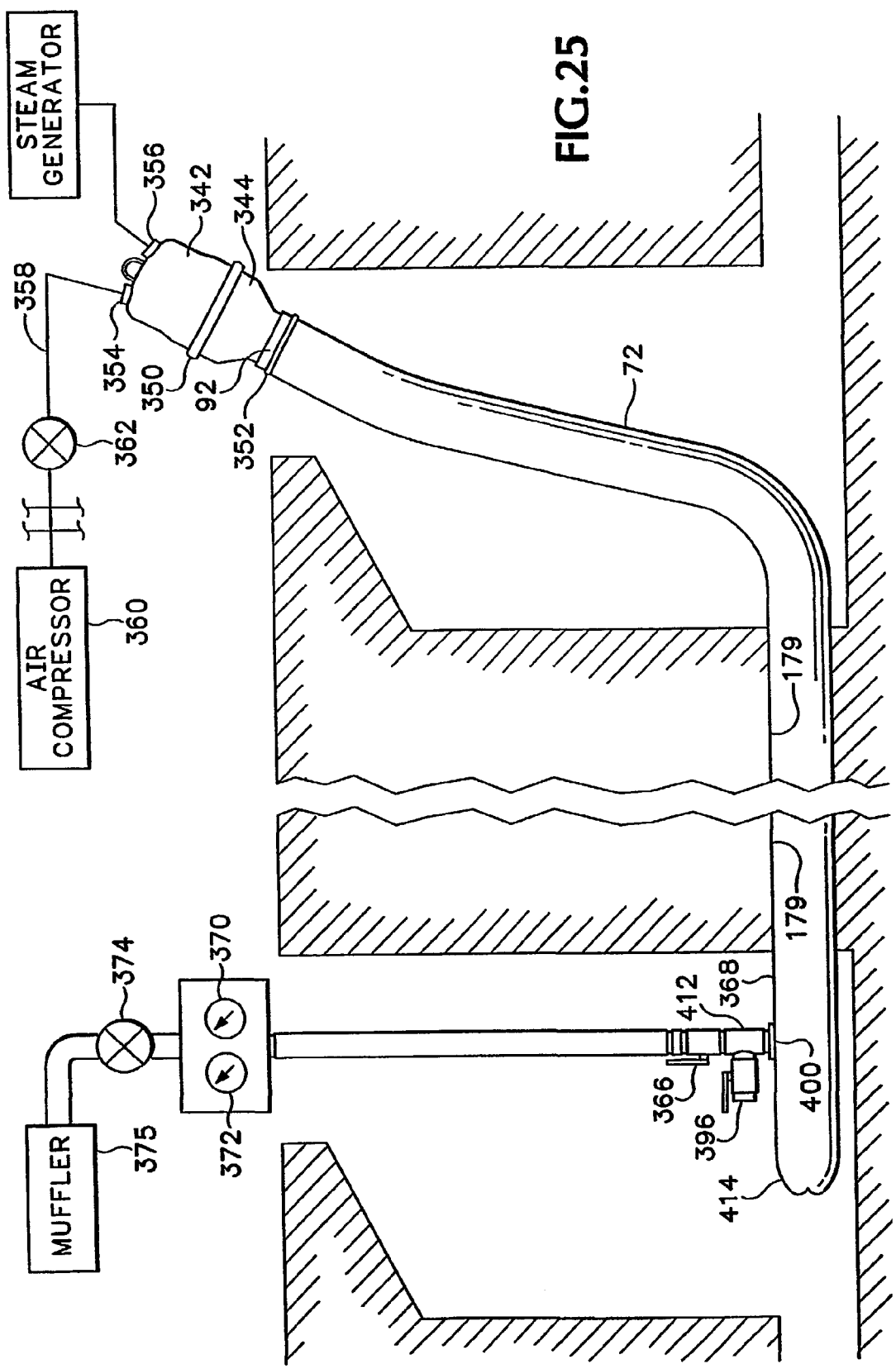
FIG. 25 is a partially schematic sectional view of a length of sewer pipe being repaired in accordance with the present invention, and showing the use of pressure retaining fittings at the ends of the liner tube being used to repair the sewer pipe.
Figure 26:
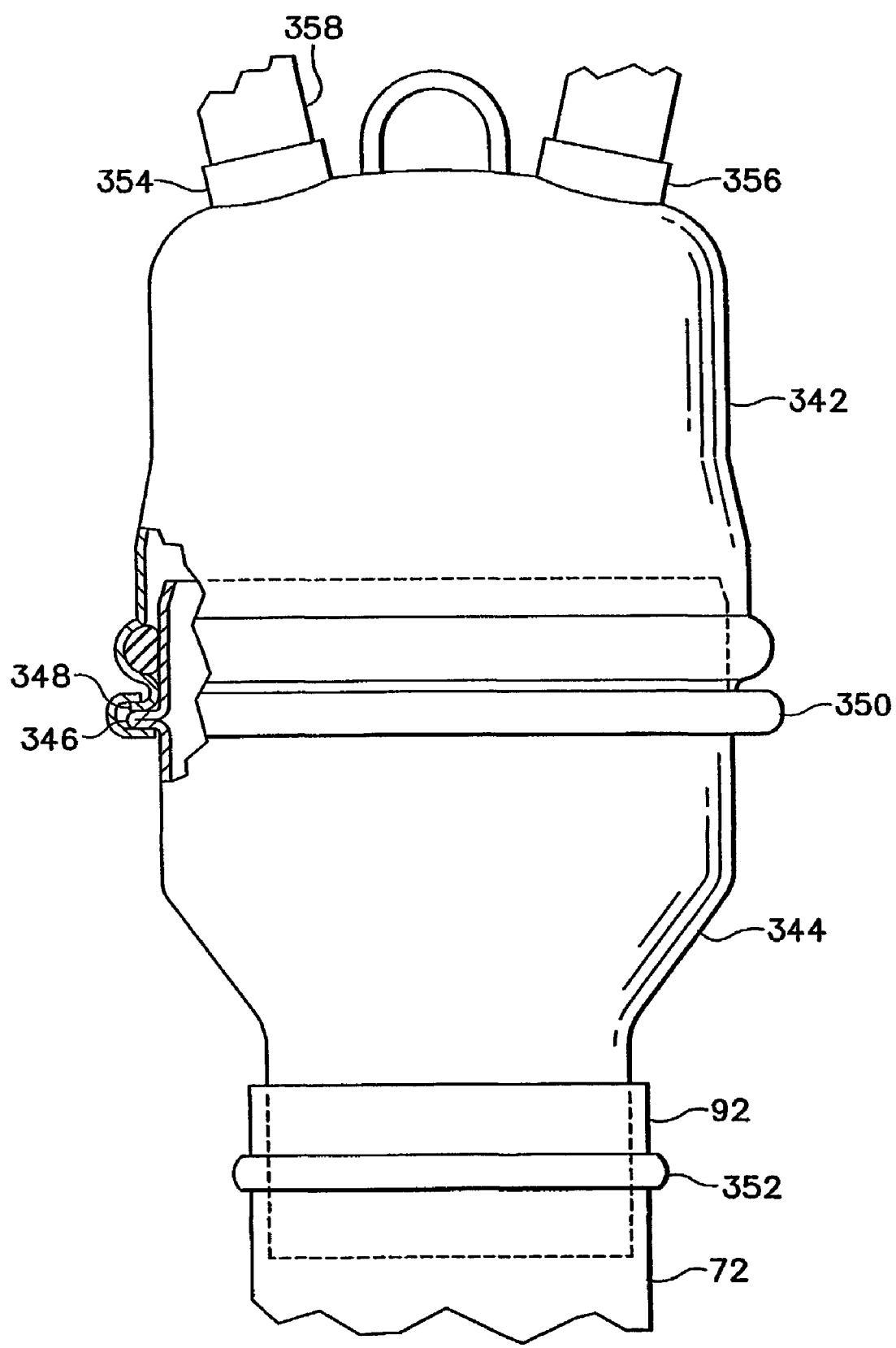
FIG. 26 is a side view, at an enlarged scale, of an end of a liner tube with a liner attachment nozzle attached thereto and a curing closure fitting attached to the nozzle for use during the curing of a liner tube used to repair the length of sewer pipe shown in FIG. 25.

Referring now to FIGS. 25 and 26, once a tubular liner 72 has been everted into a segment of conduit 179 being repaired, it is necessary to cure the plastic resin or other bonding and strengthening material with which the liner wall material is impregnated before installation. While it is possible to leave the liner 72 connected to the everter apparatus 16 as shown in FIG. 1 during the process of curing the liner in place, in many cases it is preferred to disconnect the liner 72 from the everter so that the everter apparatus 16 can be moved to another site for installation of another liner while the first one cures. For that reason, a pressure retaining inlet, or "A" end, fitting 342, which could also be called a pressure cap or steam cap, is provided and mates with a liner attachment hookup nozzle 344 which can be connected to the outlet opening of the everter. The inlet or "A" end fitting mates sealingly with the liner attachment hookup nozzle 344, as by a clamping arrangement in which a rim 346 of the liner attachment hookup nozzle 344 faces a rim 348 of the "A" end fitting 342, with a suitable gasket arrangement provided, while a clamp 350 holds the two items together by encircling the rims 346, 348. Other clamp arrangements could also be used, such as one similar to that described above in connection with the attachment clamp 80. The liner attachment hookup nozzle 344 of the appropriate size includes an outlet portion that fits snugly within an end of a section of tubular liner 72 which is then attached to the nozzle 344 securely by the use of a band-type clamp 352. Use of the "A" end fitting as just described and as shown in FIGS. 25 and 26 makes the everter apparatus 16 available quickly for use at another site while the liner 72 is curing.

A pair of inlet ports 354 and 356 are provided in the "A" end fitting or cover 342 and include fittings to which hoses or other suitable conduits may be connected. An air manifold may be connected between an air compressor 360 and the port 354 through a conduit 358 and a cutoff valve 362, to provide a vigorous flow of air through the interior of the liner tube 72, to keep it inflated and thus tightly pressed against the interior of the conduit 179 being repaired. If necessary, the valve 362 can be used to throttle the flow of air to the port 354.

Steam or hot water may be provided through the other port 356, in order to raise the temperature within the newly everted liner tubing 72 to start and maintain the chemical reactions necessary to cure a thermosetting resin used to impregnate the felt material of the typical tubular lining 72 used for this type of repair of a conduit 179. Alternatively, steam or heated air could be fed through the port 354 together with the flow of air from the compressor 360 and a pressure or temperature gauge could be installed in the port 356.

At its opposite, or "B" end, the newly installed tubular liner 72 is closed, as shown in FIGS. 1 and 25. A conduit 364 such as an exhaust hose equipped with a cutoff valve 366 is connected to the liner at the far, or "B" end 368, in a sealing manner in order to maintain pressure within the liner 72 while it is curing. This may be accomplished simply by opening the end of the liner tube and clamping it around a length of pipe (not shown) large enough to carry the desired volume of air to assure adequate flow in the liner for curing, and the hose is connected to the pipe.

Preferably, the conduit 364 is connected to temperature and pressure gauges 370, 372, so that the temperature and pressure can be monitored and controlled at the far, or "B" end of the conduit being repaired. The pressure can be controlled by use of a valve 374 to relieve excess pressure. Such a valve 374 may be operated manually, or it may be a pressure regulating valve adjusted to maintain automatically a desired pressure at the "B" end, about 10 psig, for example, to ensure flow of a fluid curing agent such as hot air or steam throughout the segment of conduit 179 being repaired. In response to the temperature being too high or low, the amount of hot air or steam admitted through the "A" end port 356 can be adjusted as required. A muffler 375 may be provided.

Figure 27:
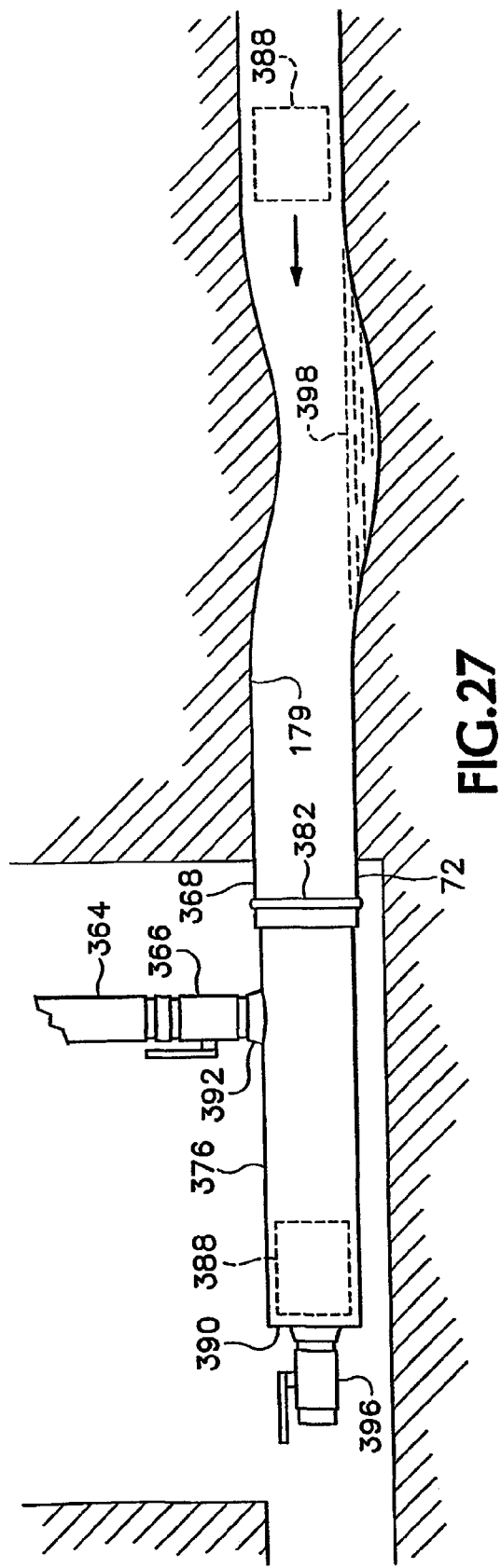
FIG. 27 is a diagrammatic view of a portion of a sewer pipe being repaired, showing a clean-out pig in use to clear the repaired sewer pipe, and showing an end fitting used to regulate the pressure of a fluid contained within the repair liner.
Figure 28:
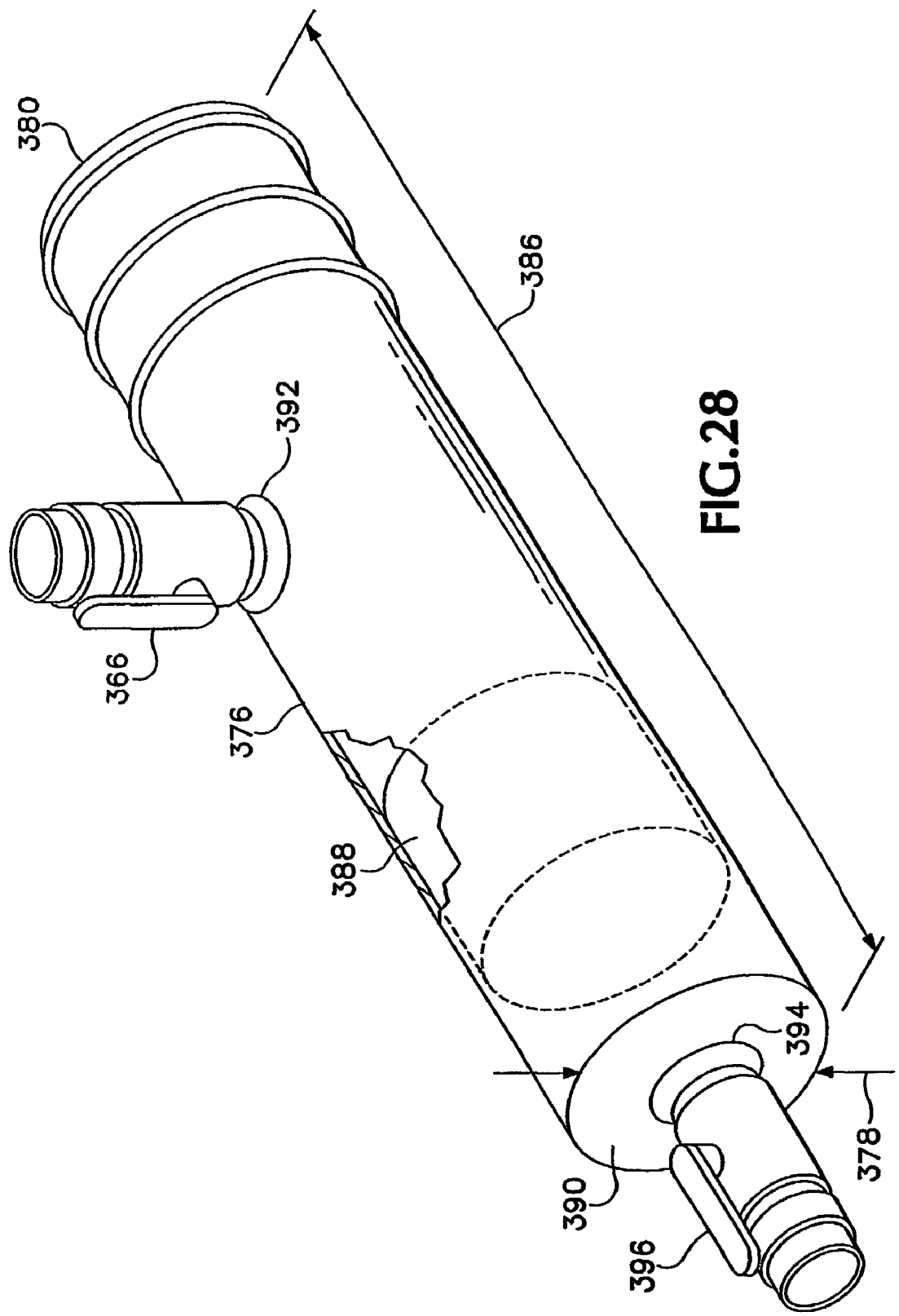
FIG. 28 is a partially cutaway isometric view, at an enlarged scale, of the end fitting and pig receptacle shown in FIG. 26.

As shown in FIGS. 27 and 28, a preferred "B" end or pressure retaining outlet fitting 376 according to the present invention is generally cylindrical and may be made of sheet steel or thin wall pipe with a diameter 378 similar to the diameter of the tubular lining 72 with which it is to be utilized. A first end 380 of the "B" end fitting is open, and the end of the tubular liner 72 can be fitted over it and fastened by a suitable band-type clamp 382. The outlet fitting 376 includes a cylindrical cavity 384 whose inside diameter is similar to the inside diameter of the liner. The cavity has a length 386 which is great enough to receive at least one and preferably more than one clean-out pig 388 in the second 390, or far end of the fitting, while an exhaust port 392 is located closer to the first, or open end 380 of the fitting.

A drain port 394 is located in the far or second end 390 of the fitting 376. The drain port 394 is provided with a valve 396 which may be used to drain hot water used to cure a liner after installation, or to drain condensate from a liner in which steam has been used to provide the heat necessary to promote curing of the liner, but the valve otherwise would usually be kept closed.

A suitable valve 366 is associated closely with the exhaust port 392, to which a conduit 364 may be connected to direct exhausted air and steam away from the manhole or other point of access to the "B" end of the segment of conduit being repaired. As shown in FIG. 25, it is preferred to connect such a conduit to a suitable pressure regulating valve 374 and to pressure and temperature gauges 370, 372 to monitor and control the curing process.

In many cases conduits being repaired include low spots such as at 398, where the intended or original continual downstream slope is no longer present, and fluids such as hot water and condensate from steam used to provide the necessary heat for curing the tubular liner material tend to accumulate undesirably. To remove such pooled water and to clean the liner and ensure that smooth flow is available through the repaired conduit, it is often desirable to force a clean-out pig 388 through the repaired conduit under the pressure of the heated air or other fluid utilized to cause the liner material to cure.

Suitable pigs are available commercially. For example, the YBS series of pigs available from Girard Industries of Houston, Tex. are suitable. Such pigs are cylindrical or bullet-nosed cylindrical polyurethane foam bodies which can easily be inserted into a tubular liner through the liner attachment hookup nozzle at the "A" end of a segment of conduit which has been repaired.

The "B" end fitting 376 shown in FIGS. 27 and 28 allows exhaust of air or an air and steam mixture from the far or "B" end of the conduit while such a pig 388 is being propelled through the conduit. When the pig reaches the "B" end fitting 376 it continues to move past the exhaust port and is retained within the cavity 384 until curing is completed and the fitting is removed from the newly installed liner 72.

Figure 29:
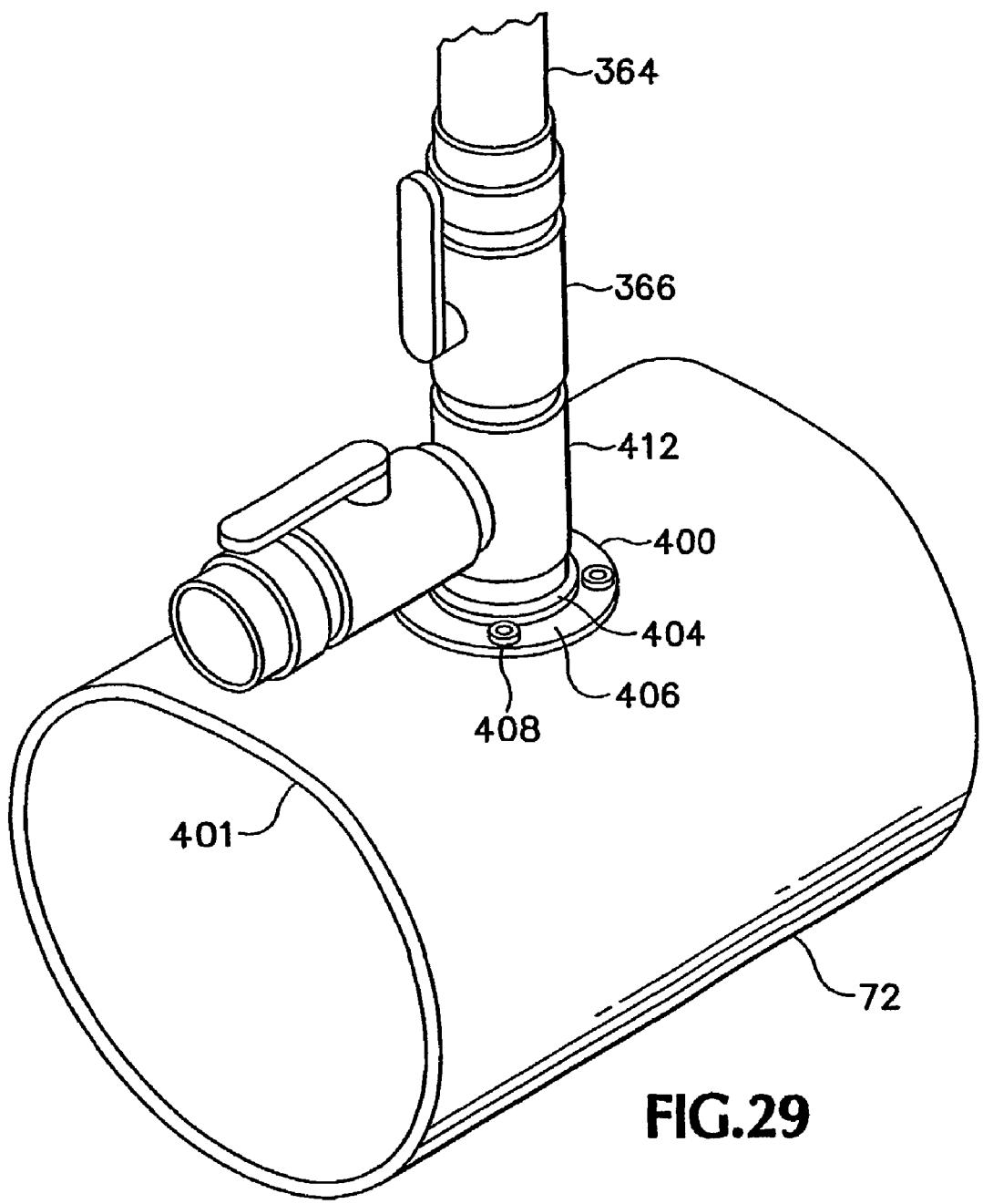
FIG. 29 is an isometric view of a length of liner tubing and an exhaust valve manifold attached thereto by a connector port assembly.
Figure 30:
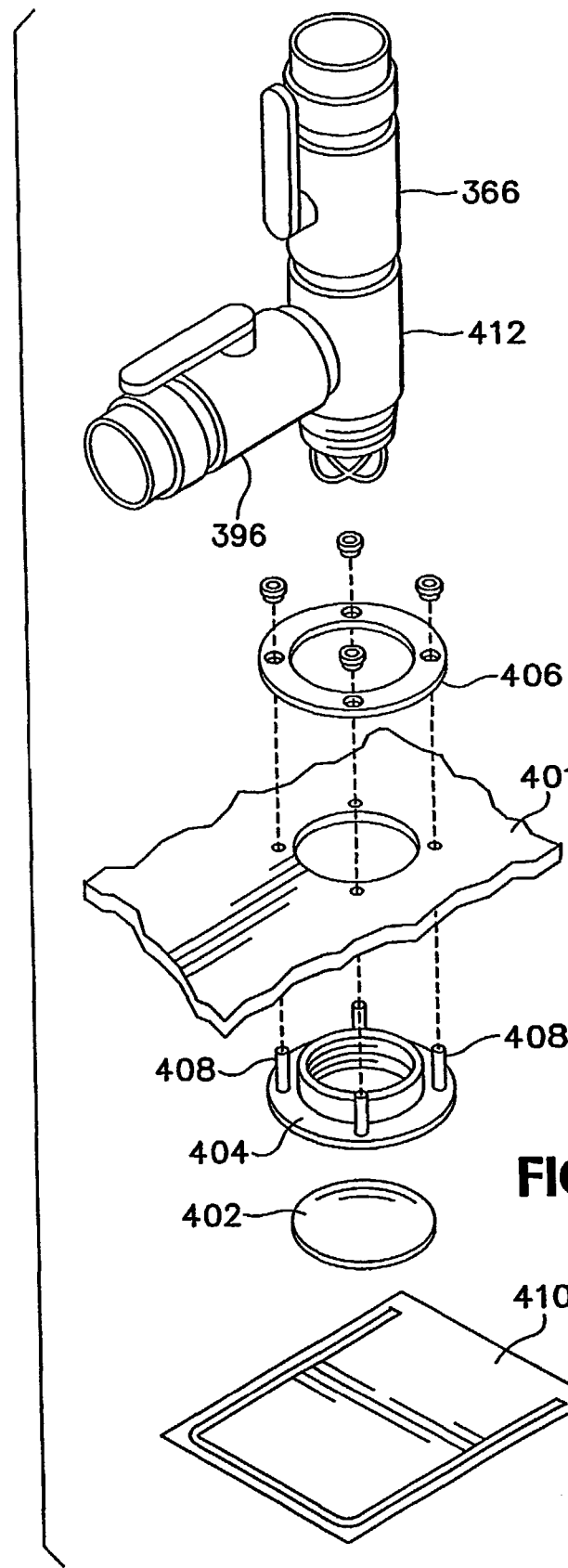
FIG. 30 is an exploded view showing the manner of attachment of the connector port assembly shown in FIG. 29.

Referring to FIGS. 25, 28, 29 and 30, in situations where it is not desired to use a pressure retaining outlet fitting such as the "B" end fitting 376 shown in FIGS. 27 and 28, an exhaust port 400 may be installed in the liner itself as shown in FIGS. 29 and 30. The exhaust port 400, when installed, is generally planar so that a tubular liner including such an exhaust port can pass through an everter such as the everter 16, allowing the tail end of the liner to remain closed after it has been everted into the conduit being repaired, as shown in FIG. 25. A soft plug or other type of knockout plug 402 is installed in such a port 480, which is installed in a hole of appropriate size cut into the liner material 401 near the tail end. The port includes, in one embodiment, a first flange 404 defining a tubular central portion equipped with threads and a seat for a suitable knockout plug 402. The first flange 404 is mounted on the side of the liner tube wall material that faces outward before it is everted. That is, the first flange 404 is mounted on the polyurethane coated side of the felt liner tube wall. A backing flange 406 is located on the opposite side of the material. Flathead bolts 408 or welded studs and T-nuts are used to hold the flanges together in place in the liner. A sheet 410 of polyurethane may be attached to cover the first flange 404 and protect the polyurethane coating of the portions of the liner 72 already in place, as the exhaust port 400 is carried along the length of a segment of conduit 179 being repaired.

Once the liner tube 72 has been everted in a conduit 179 the knockout 402 or other plug is displaced and an exhaust fitting or valve manifold 412 is installed in the port to permit adequate flow and maintain pressure within the liner tube during its curing. A portion 414 of the liner may be left intact with its end closed beyond the location of the port as shown in FIG. 25 and may be used to receive pigs 388 sent through the conduit. This may be particularly desirable in the process of repairing conduits whose diameter is larger than a few inches, where a "B" end fitting 376 such as that shown in FIGS. 27 and 28 could be cumbersome.

It will be understood that the direction in which the liner 72 is everted into a section of a conduit 179 does not require that air and steam or another fluid curing agent be installed from a particular end of the newly everted liner. Thus, the "A" end fitting 342 may be installed at the far end 368, distant from the everter 16. The "B" end fitting 376 or another connection to a suitable exhaust pressure control valve 374 and a drain valve 396 may then be located at the near end 92, where the everter 16 was used.

Figure 31:
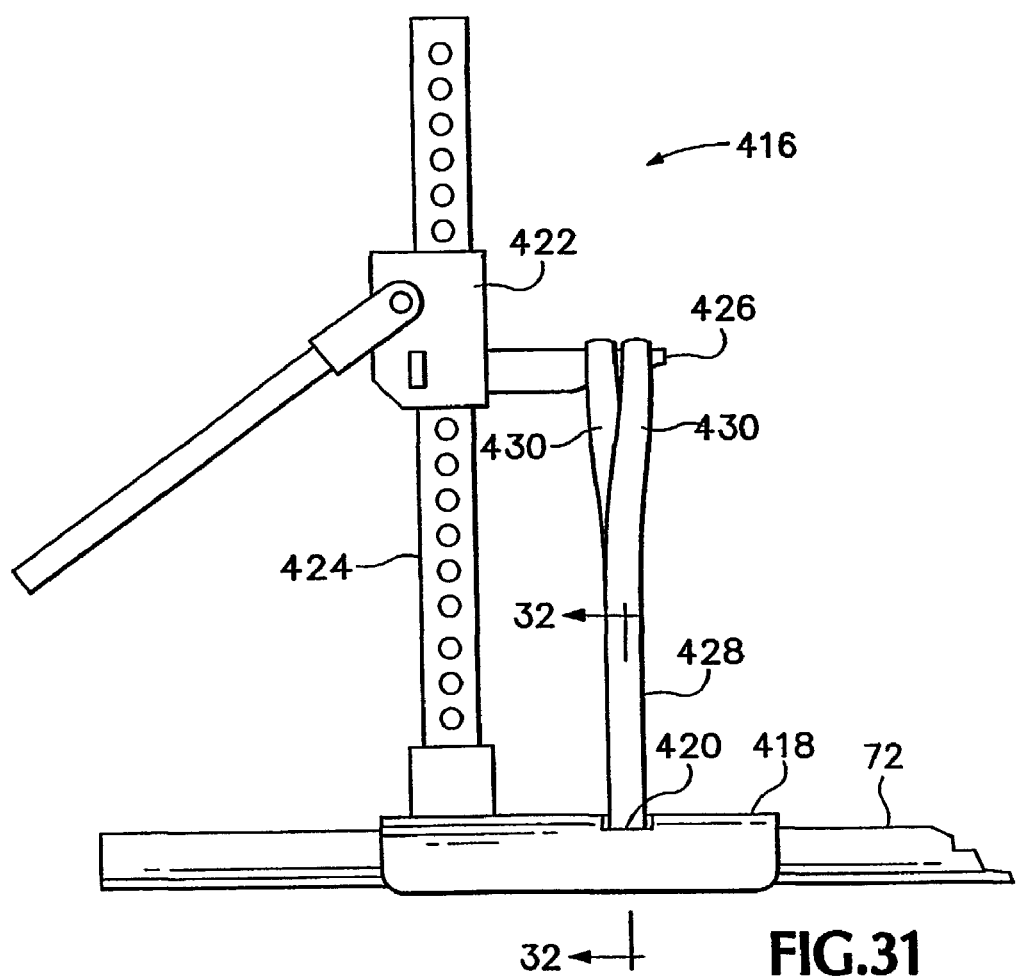
FIG. 31 is a view of a pinch-off tool in use to close off a section of liner tubing temporarily to permit installation of an end fitting.
Figure 32:
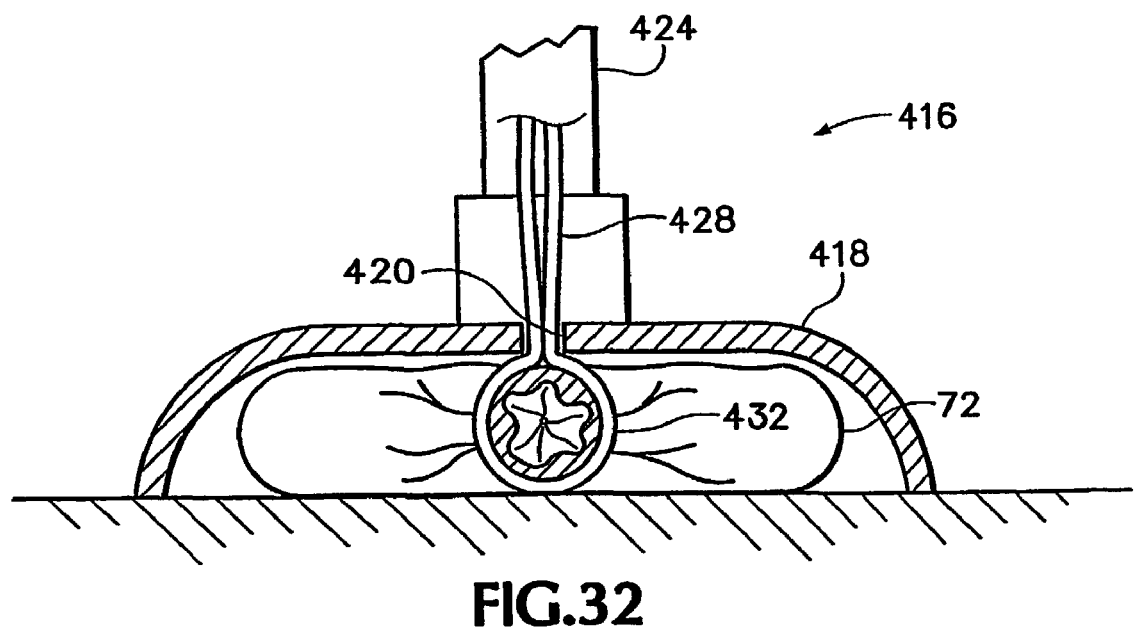
FIG. 32 is a sectional view taken along line 31—31 of FIG. 30.

FIGS. 31 and 32 show a pinch-off tool 416 used to close off a section of a liner 72 temporarily, as to permit installation of an end fitting. While primarily useful at the far or "B" end 368 of a newly everted liner 72, such a tool might also be used at the near, or "A" end while preparing to disconnect the liner attachment hookup nozzle 344 from the everter box 50 in preparation for connecting a pressure retaining "A" end fitting 342 to the hookup nozzle. The pinch-off tool 416 in a preferred embodiment is somewhat similar to a bumper jack for an automobile, and includes a base in the form of a saddle 418 curved to fit against the cylindrical outer surface of a liner tube 72. The saddle 418 has a choker hole 420 extending though it in line with a traveler 422 mounted on a track 424 extending away from the base. The traveler 422 is controllable by a suitable mechanism such as a lever-operated ratchet mechanism cooperating with the track 424, although other mechanisms such as hydraulic or pneumatic motors or screw arrangements could also be used to move the traveler 422 along the track 424. The traveler includes an arm or hook 426 extending away from the track and extending above the choker hole 420 in the saddle 418. A strong flexible elongate choker member 428, such as a rigging sling of synthetic fabric with an eye 430 in each end, is attached to the hook or arm 426 of the traveler, with a middle portion extending through the hole and forming a loop 432 beneath the saddle, within which the tubular liner 72 is squeezed or choked off tightly enough to maintain the required pressure within the liner 72 while the end of the liner is cut, a tail rope 182 or lay flat hose is released, and a suitable fitting such as the "B" end fitting 376 shown in FIG. 28 is attached to the liner 72 and made ready for use.

Figure 33:
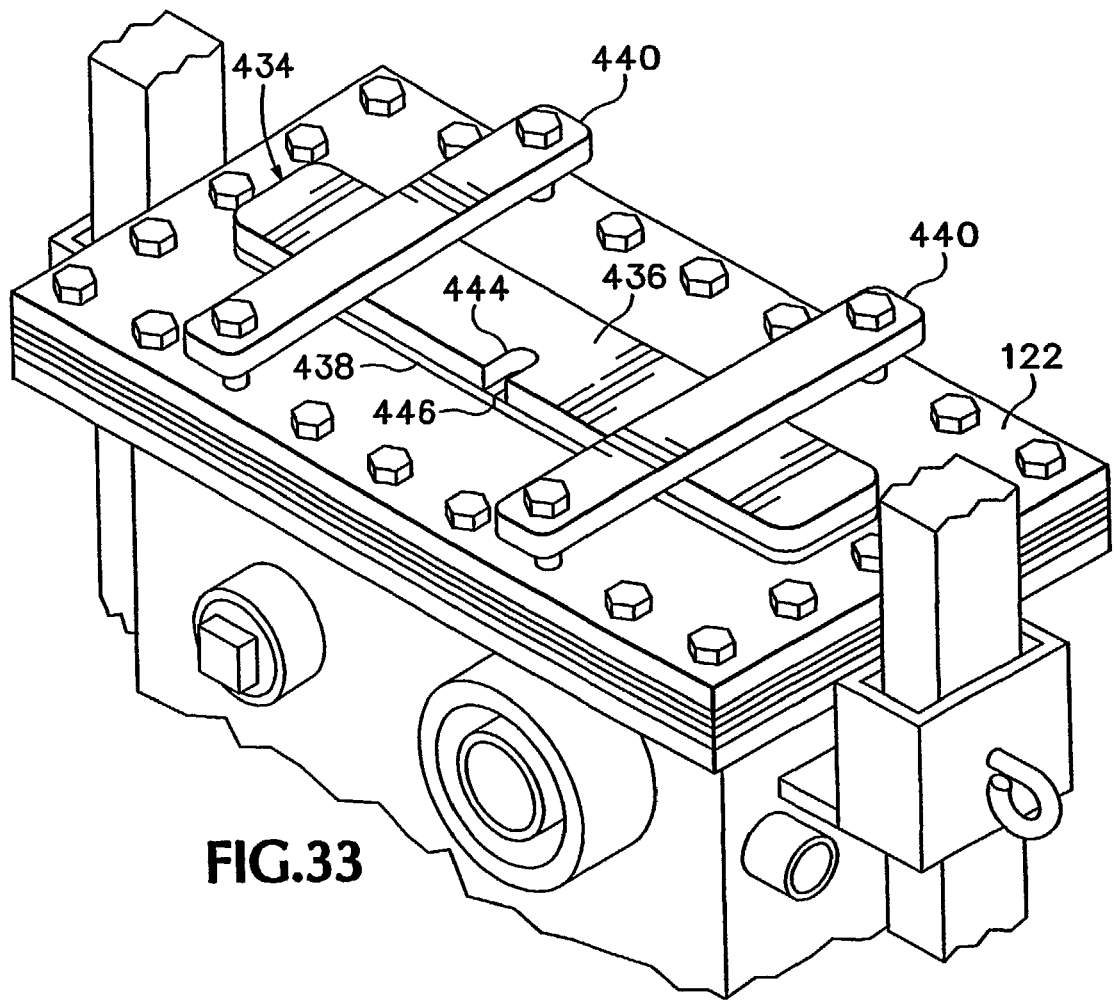
FIG. 33 is an isometric view of the top of an everter box according to the invention equipped with a curing closure to seal the inlet slot during curing of a liner.
Figure 34:
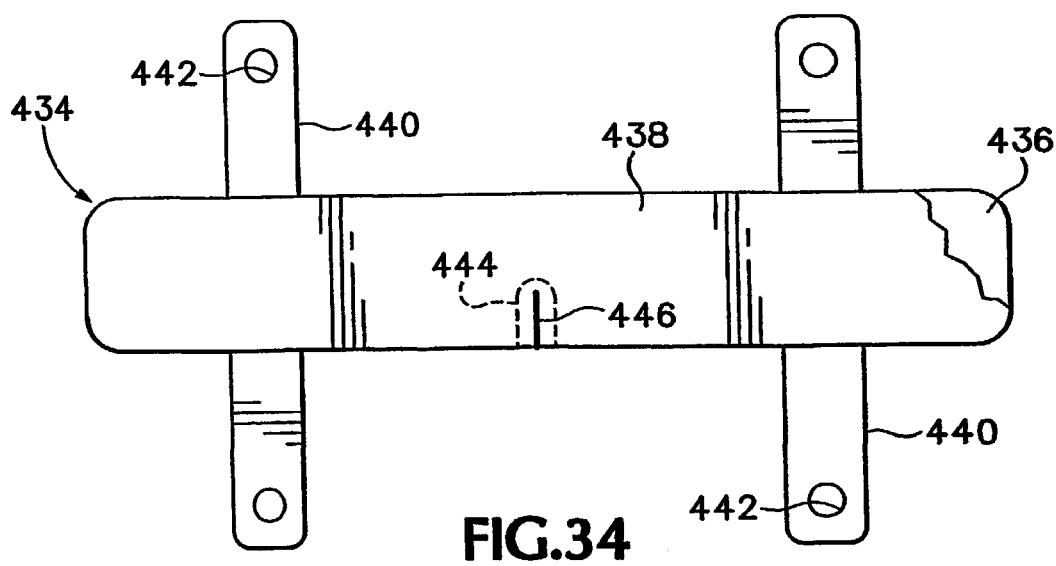
FIG. 34 is a bottom plan view of the curing closure shown in FIG. 33.

Referring next to FIGS. 33 and 34, when it is desired to keep the everter apparatus 16 in place and attached to a flexible liner 72 during the curing process, a closure 434, shown in FIG. 33 installed on the everter box 50, is used to close off the inlet slot 125 in the cover plate 122 more tightly than is accomplished by the lips of an inlet port used in pulling a liner 72 into the everter box 50. Once the tail end of the liner 72 has passed into the everter box 50, the closure 434 could be installed, even before the liner tube 72 has become fully everted within the conduit 179 being repaired.

The closure 434 includes a metal plate 436 large enough to fully cover the slot 125, and preferably has a gasket attached to its lower face. The gasket 438 may, for example, be made of felt of the same type used in a wall of a liner 72, with a layer of polyurethane bonded to one side of the felt. The polyurethane coated side of the felt preferably faces downward to provide a tight seal against the upper surface of the cover plate 122 of the everter box 50.

A pair of bars 440 are welded to the top of the plate 436 and extend outward on each side. The bars 440 include a bolt hole 442 at each end, to receive bolts to attach the curing closure 434 to the top of the everter box 50 as shown in FIG. 33. The plate 436 defines a notch 444, seen in FIG. 33, and the gasket 438 includes a slit 446 extending in from one side, aligned with the notch 444, so that the curing closure 434 can be installed at once after the tail end of a liner 72 has passed into the everter box 50, with the tail rope 182 continuing to pass into the everter box 50 through the notch 444 and between the lips of the sealing port beneath the cover plate 122.

Using the apparatus of the invention just described it is possible to install and evert tubular liners to repair conduits quickly and inexpensively, without the need for such large equipment as that described in the prior art, Wood, U.S. Pat. No. 4,064,211.

As described above, most typical competitive pipe everting units either use a column of water or a bladder to maintain pressure within the everting apparatus. Such competitive everter apparatus are typically large and bulky. Because everter apparatus 16 uses invented sealing port 106, it is lighter and more compact than typical competitive everters The invented everter apparatus can be less than 10 feet tall; some competitive everter apparatus are 30 feet tall. Competitive everters are typically mounted on their own heavy duty vehicle, are too tall to pass beneath residential utility lines and often require a substantial amount of time to set up, including attaching guide wires to the tall apparatus. Because everter apparatus is so light and small, less than 500 pounds, in another embodiment, without the frame 18, it is sufficiently lightweight and sufficiently small that, with handles added to it, it can be transported for a distance of at least 200 feet by two strong workmen. The width of this embodiment of everter apparatus 16 is approximately 22 inches without mounting sleeves 58 and 28 inches with mounting sleeves 58. One embodiment of everter apparatus 16 is approximately nine feet tall. One embodiment of everter apparatus 16 is mounted on a mobile cart which can be attached to an ordinary pick-up truck and delivered to the approximate pipe repair location and, thereafter, wheeled by two men through residential areas to the pipe repair location.

An embodiment of everter apparatus 16 may be operated with compressed air supplying air from a one-inch, or less, air hose. One embodiment uses a ¾-inch air hose. Typical competitive everters often require a large fire hydrant type water hose to fill the water column and underground conduit and pipe liner and evert the liner. Everter apparatus 16 typically uses air to start the evertion process, and follows the initial air with a compressed air and water nix. One method, for example, begins with air or water, or both; but, after the tail goes through the everter, uses an air chaser. Everter apparatus 16 requires less water than do typical apparatus competitive everters. This is possible with everter apparatus 16 because sealing port 106 is designed to permit slipping liner 72 through everter apparatus 16 without needing columns of water or bladders to hold the greater than ambient pressure within everter apparatus 16.

Everter apparatus 16 may usefully use air as its primary "fluid" driving evertion of the liner 72. Using primarily air rather than primarily water to operate everter apparatus 16 is a competitive advantage. Compressed air is accessible everywhere and air compressors are easier and quicker to provide and to set up than large water hoses used by typical competitive everters to evert lines. Typical competitive everters often require a supply of water from a fire hydrant type municipal water supply within approximately 300 feet capable of supplying a 15 gallons per minute flow of water to the everter. A typical garden hose blows at 15 gpm. A typical fire hose (200'×2½") blows at more than 100 gpm. Everter apparatus 16, using compressed air from a transportable air compressor, may be used in areas remote from municipal water supplies. Because everter apparatus 16 uses less water than typical competitive everters, it causes less mud, mess, water damage, and water soaling at the pipe repair site.

Typical competitive everters are limited to starting and completing approximately one job per day because it takes a substantial period of time to bring typical competitive everter apparatus to the pipe repair location, set the everter apparatus up, attach water lines to a substantial water source, evert the liner, then cure the liner in place in the pipe being repaired, pack the everter up, and clean up the mess caused by the large amount of water used.

As discussed above, smaller and lighter everter apparatus 16 can be easily transported to the proximate pipe repair location and then more easily hand-wheeled on its wheels to the exact pipe repair location. Turning on the portable air compressor is quicker than connecting to a substantial water supply. Once liner 72 is everted, everter apparatus 16 can be more easily removed and transported to another pipe repair jobsite and replaced at the initial pipe repair site with a steam cap and steam generator along with some air compressor as shown in FIG. 25 for curing of liner 72. This permits the more valuable everter apparatus 16 to be used on more than one pipe repair job in a day, sometimes as many as three or four jobs in a work day. This is a substantial competitive advantage over typical competitive everters.

In one embodiment, the invented everter pipe repair system improves the pipe repair and liner sealant curing process by opening the end of liner 72 at its "B" end, attaching a pressure release valve and temperature and pressure gauges there and using the sane, in combination with appropriate steam, water, and air apparatus at the "A" end, to facilitate and control a continuous flow through liner 72. For example, air compressor 360 may be run wide open, sending air into the "A" end of liner 72 through liner 72 and out the "B" end of liner 72. The air pressure within liner 72 is controlled with a pressure gauge and pressure release valve at the "B" end of liner 72. A typical preferable air pressure in liner 72 as measured at its "B " end is about 9 psi, although useful air pressures can be as high as 14 or as low as 5. Once a continuous flow is established at an appropriate volume and pressure through liner 72, steam may be added to the flow through a pressure cap 342, into liner 72's "A" end and circulated through liner 72 and out liner 72's "B" end. The exit temperature of the steam is measured by a temperature gauge 370 at liner 72's "B" end and regulated by regulating either the amount of steam entering at liner 72's "A" end or by regulating the amount of the steam and air mixture exiting at liner 72's "B" end via controlling the exiting volume and pressure valve at liner 72's "B" end, or both. The steam temperature should be high enough to heat liner 72's thermosetting resins or other sealant sufficiently to cure it, but not so hot as to blister liner 72. A preferable temperature for the exiting steam is approximately 180–200 degrees Fahrenheit. End fitting 376 shown in FIGS. 27 and 28 is not typically used in competitive everting or curing operations. It speeds completion of pipe repair jobs.

Some thermosetting resins cure with exothermic reactions. In this event, the air passing through liner 72 needs to remove heat from within liner 72 and steam is not added; rather, liner 72 is air cooled by blowing cooling air or other fluid through liner 72. Many typical competitive repair processes use hot water to cure the liner's thermosetting resins or other sealant. The above described method of flowing air and steam through liner 72 is both more economical and produces better curing results and requires less equipment and cleanup and capital and is quicker. Some resins are referred to as sealants.

An additional benefit of accessing the "B" end of liner 72 is that a pig may be moved through liner 72 to squeegee out excess water or condensate, from within liner 72 as shown in FIG. 27. The pig may be propelled by pressure or pulled by a cable. This is useful because removing accumulations of condensate, etc. in low spots, produces more even curing results. Typical everting operations cure the liner via a reusable attachment leading from the everter to the "A" end of the pipe. The invented process instead cures liner 72 directly via the original liner 72 extension from ground level to the "A" end of the pipe. The method of removing everting apparatus 16 at ground level and putting steam generator cap 342 on liner 72 at ground level has the effect of "wasting" that portion of liner 72 which extends from the immediate end of the pipe being everted up to ground level because, after liner 72 is cured in place within the pipe being repaired, the portion of liner 72 extending from the end of the repaired pipe to ground level is cut off and thrown away. This cost is typically more than compensated for, however, by the time savings involved in quickly removing everter apparatus 16, replacing it with steam cap 342, and immediately beginning the curing process using the installed liner rather than cutting liner 72 off at the end of the pipe being repaired immediately after the liner is inserted and before the liner is cured. The time saved due to speed outweighs the cost disadvantage of wasting of the liner material which cannot be practicably reused.

Liner everter box 50, while preferably manufactured of aluminum plates welded together for light weight may also be comprised of other appropriate materials such as steel, reinforced plastic and the like. In one embodiment, everting apparatus weighs less than 500 pounds, a preferred embodiment weighing approximately 350 pounds. The everter apparatus 16 shown in FIG. 1, with the exception of liner tube 72, tailrope 182 and lay-flat hose 186 weighs less than 400 pounds. Removing everter box 50 from the frame substantially reduces its weight even further permitting it to be carried into difficult pipe repair locations.

Figure 23:
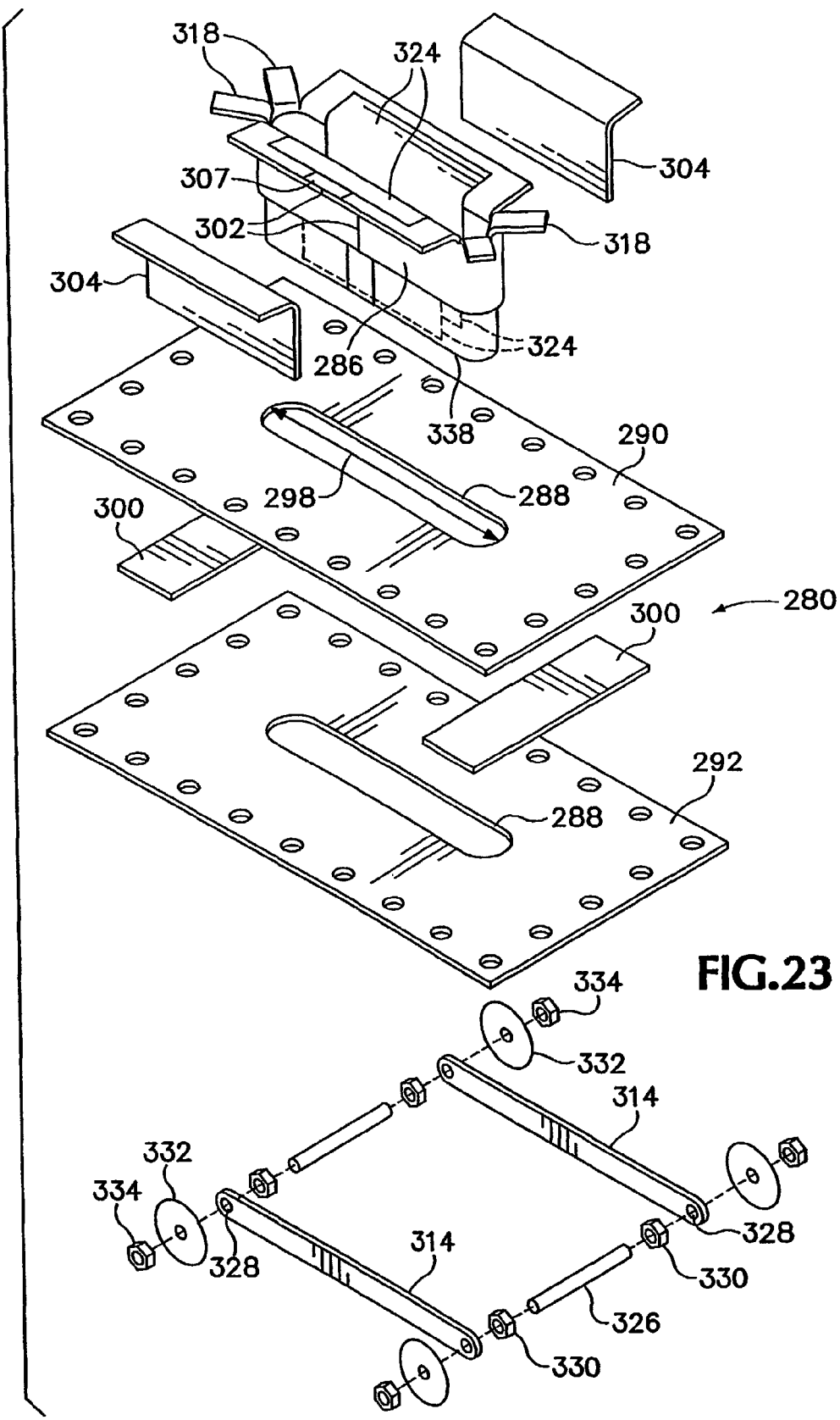
FIG. 23 is an isometric exploded view of the base sheet assembly and associated sealing lips shown in FIG. 20.

Sealing port 106 is capable of being usefully used with more than one particular size of liner without being adjusted because its lips 112 and 114 are adjustable. For example, a sealing port 106 sized to accept an 8-inch liner 72, may also usefully accept a 6-inch liner 72. This helps the economics of invented everter apparatus 16 because it keeps everter apparatus 16 in the field and operating even if sequential repair jobs require differently sized liners 72 rather than the everter having to be returned to a central location to have a new port attached to it for each new repair job which requires a different size liner. Additionally, some liners are thicker than other liners and some sealants or resins are easier to pull through the inlet port than others. Still further, in the everter apparatus 16, the seals can be changed in the field if the currently installed seals are unable to accommodate a liner. In one embodiment, adjustable inlet port nuts 330 as shown in FIG. 23 are preferrably used to limit the travel of bars 314. Inlet port nuts 330 are typically adjusted between everting jobs as needed. Adjusting inlet port nuts 330 at the jobsite involves removing bolts and cover plate 122, lifting and sliding lips 112 and 114 upon liner 72, accessing inlet port nuts 330, adjusting inlet port nuts 330, and replacing cover plate 122 and bolts. The adjustability of sealing port 106 and the ease in which seals can be changed out permits everter apparatus 16 to be used with liners of varying thickness and with resins and sealants of varying viscosities without the necessity of taking everter apparatus 16 to a central location to have sealing port 106 adjusted. This provides the benefit of being able to more continuously keep everter apparatus 16 in the field and working.

As show in FIG. 2, there is sufficient space within mounting sleeve 58 to permit everter box 50 to be angled about upright support member 26 as desired to any needed convenient angle for converter box 50 to meet prepared liner tube 72. This facilitates speedy installation and removal of everter apparatus 16 at the jobsite. Everter box 50 is light enough that it can be manually pushed into position to connect to prepared tube liner 72. Then, when pressure is added to prepared tube 1 or 72, it straightens as shown in FIG. 2. Everter box 50 can even be angled horizontally for use in everting if necessary by making small modifications to mounting sleeve 58. The stiffness of liner 72 forces everter apparatus 16 into the proper angle. The angle of everter apparatus 16 also may be adjusted at the jobsite by adjusting struts 32 within support sleeves 34 and adjusting vertical support legs 40 within mounting sleeves 42. This eliminates several alignment structures found in typical competitive everters and speeds connection and removal as compared to typical competitive everters and increases everter apparatus 16 versatility in being able to fit in and adjust to the requirements of difficult jobsites better than typical competitive everters.

Mounting sleeve 58 is oversized relative to upright support member 26. Thus, when everter apparatus 16 is being transported, mounting sleeve 58 can fit over upright support member 26. This results in a very short, vertical profile for everter apparatus 16 when it is being transported. This is particularly useful in areas that have overhead utility lines or other overhead structures.

In one embodiment, everter apparatus 16 measures less than ten feet from the top of upright support member 26 to the ground. Still, because everter apparatus 16 is lightweight and small compared to typical competitive everters, it can, when necessary, be removed entirely from frame 18 and manually carried through passageways, up and down staircases, etc., as may be necessary to reach difficult locations such as a basement or other hard-to-access location. Everter apparatus 16 can be disassembled into its component parts, moved to any location, and then reassembled for use. Everter box 50 is less than five feet tall. In another embodiment, upright support member 26 is comprised of two separate vertical pieces, their attachment being a male/ female arrangement where the lower end of the upper part of upright support member 26 is a male attachment fitting within a female attachment of the upper end of the lower part of upright support member 26, or vice versa.

In one embodiment, everter apparatus 16 is swivelled forward during transportation at sleeve-like socket 28, which considerably shortens its vertical height and makes it more stable while being moved. In this embodiment, everter apparatus 16 is rotated vertically upward upon arriving at the site for positioning and use.

It is understood that "fluid" as used herein includes liquids, gases, and combinations of liquid and gas such as steam.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In combination with a flexible tubular liner being installed to effect repair of a conduit, a "B" end fitting comprising:

(a) a body having an open circular first end aligned with and sealingly connected with an end of said tubular liner and a cylindrical cavity extending inward from said first end toward a second end, said cavity having a diameter similar to an internal diameter of said tubular liner;

(b) an exhaust port communicating with said cavity at least a predetermined distance from said second end;

(c) a drain port communicating with said cavity; and (d) a respective valve associated with each of said ports, said valves being operable selectively to seal and to permit flow of fluid from within said tubular liner.

2. The combination of claim 1, including a pressure gauge connected with said "B" end fitting and operatively located to sense fluid pressure within said tubular liner adjacent said "B" end thereof.

3. The combination of claim 1, including a temperature gauge operatively associated with said "B" end fitting and arranged to sense a temperature of fluid within said tubular liner adjacent said "B" end thereof.

4. The combination of claim 1 wherein one of said valves associated with said exhaust port is a pressure regulator.

5. The combination of claim 1 wherein said drain port is located at said second end.

6. A flexible tubular liner for repair of a conduit, comprising:

(a) a first end portion for installation at a near end of a segment of a conduit to be repaired and from which said liner is extended by eversion inside said conduit;

(b) an intermediate portion for installation by eversion in said conduit to extend toward a far end of said segment;

(c) a second end portion to extend from and beyond said far end of said segment, said second end portion including a connector defining a port closed by a removable plug, said connector and said plug together being generally planar and being mounted in and oriented parallel with a wall of said second end portion.

7. The tubular liner of claim 6 wherein said plug is a knockout plug arranged to be removed from said port when said second end portion of said tubular liner extends from said far end of said segment of conduit.

8. A tool for temporarily closing off a flexible tubular liner and facilitating installation of an outlet fitting, comprising:

(a) a base including a saddle defining a choker hole therein;

(b) a track;

(c) a traveler mounted on said track for movement therealong;

(d) a mechanism interconnecting said traveler and said track and operable to move said traveler along said track away from said base; and (e) a length of strong flexible material attached to said traveler and extending through said choker hole as a loop beneath said saddle, said loop being decreased in size by said movement of said traveler away from said base.

9. The tool of claim 8 wherein said length of strong flexible material includes an eye at each end, each of said eyes extending around a portion of said traveler.

10. A method of installing a liner in a hollow conduit, comprising:

(a) everting a flexible liner tube impregnated with an uncured bonding and strengthening material into said conduit through an everter from a first access point to a second access point;

(b) thereafter disconnecting said flexible liner tube from said everter and interconnecting a pressure retaining inlet fitting with said flexible liner tube, in communication with an interior thereof, at a position in said flexible tube proximate one of said first and second access points; and (c) forcing a quantity of a fluid curing agent under a first pressure into the interior of said flexible tube through said inlet fitting.

11. The method of claim 10 wherein said step of everting includes connecting a hookup nozzle to said flexible tube at a first end thereof and everting said flexible tube through said hookup nozzle, and wherein said step of installing said inlet fitting includes mating a pressure cap with said hookup nozzle.

12. The method of claim 10, including providing a quantity of steam as a part of said fluid curing agent.

13. The method of claim 12, including the step of controlling the temperature of said fluid curing agent within said flexible tube by regulating the amount of steam included in said fluid curing agent.

14. The method of claim 10, including providing a quantity of hot water as apart of said fluid curing agent.

15. The method of claim 10, including providing a quantity of hot air as a part of said fluid curing agent.

16. The method of claim 10 wherein said step of everting includes the steps of connecting a hookup nozzle to said flexible tube at a first end thereof, and releasably mating said hookup nozzle to an everter and thereafter everting said flexible tube through said hookup nozzle; and wherein said step of installing said inlet fitting includes unmating said hookup nozzle from said everter and thereafter mating said hookup nozzle with said inlet fitting.

17. The method of claim 10, including the further steps of installing a pressure retaining outlet fitting in said flexible tube in communication with said interior thereof adjacent the other of said first and second access points; and establishing and regulating a predetermined second pressure within said flexible tube for a predetermined curing time, by releasing a controlled amount of said fluid curing agent through said outlet fitting.

18. The method of claim 17 wherein said step of establishing and regulating said second pressure includes operating a pressure regulating valve associated with said outlet fitting.

19. The method of claim 17, including providing a quantity of steam as a part of said fluid curing agent and draining condensate from said liner through a condensate drain in said outlet fitting.

20. The method of claim 17, including the further steps OF: (a) introducing a pig into said liner through said hookup nozzle; (b) propelling said pig through said liner under pressure; and (c) catching said pig in a pig receptacle portion of said outlet fitting.

21. Apparatus for use in everting a flexible tubular liner into the interior of a hollow conduit, comprising:

(a) a liner everter container having a bottom having an out feed element defining out feed opening and having a top end including an inlet opening through which a liner can be fit into said liner everter container;

(b) a liner inlet port assembly associated with said top end and defining said inlet opening in said top end, said liner inlet port assembly comprising:

(i) a pair of opposite ends interconnecting said sides;

(ii) an inlet mouth having a length and a pair of opposite sides extending along said length;

(iii) a pair of flexible lips interconnected with said mouth and located respectively on said opposite sides of said mouth and including respective exterior sides and respective sealing surfaces facing toward each other, said lips extending a first distance into said liner everter container toward said bottom, said distance being great enough for mutually confronting portions of said sealing surfaces to be pressed sealing against each other by fluid pressure within said liner everter container in excess of ambient atmospheric pressure surrounding said liner everter container;

(c) said apparatus being designed and constructed to primarily use compressed air to evert said liner and additionally comprising an air compressor capable of supplying sufficient compressed air to said apparatus to evert said liner within the hollow conduit said liner is to repair, said air compressor being in communication with said apparatus.

22. The apparatus of claim 21 wherein said apparatus is designed and constructed to weigh less than 500 pounds, to be capable of being moved through passages thirty-four inches wide, and to be capable of being moved under obstructions 13 feet high.

23. The apparatus of claim 21 additionally comprising a steam generator cap which, after removal of said liner everter container from said liner, maybe placed in communication with said liner and usefully used to generate and communicate sufficient steam into said liner to cure a sealant between said liner and said hollow conduit, said steam cap not having a liner inlet.

24. The apparatus of claim 21 additionally comprising an outlet fitting capable of being attached to said liners "B" end, said outlet fitting including a temperature gauge and a pressure gauge and a pressure release valve, said outlet fitting, in combination with a steam generator in communication with said liner, being useful for permitting steam to flow from said steam generator into said liner, through said liner and out said outlet fitting, said temperature gauge, said pressure gauge and said pressure valve being capable of controlling the temperature and the pressure of the fluid exiting from said outlet fitting.

25. The apparatus of claim 21 additionally comprising a steam cap capable of being substituted for said top of said liner everter container after said liner has been everted into said pipe by said everting apparatus, said steam cap being capable of communicating sufficient steam into said liner to cure a sealant between said liner and said hollow conduit and said steam cap not having a liner inlet.

26. The apparatus of claim 21 additionally comprising a pig capable of being inserted into the "A" end of said liner and moved through said liner toward the "B" end of said liner and removed from said "B" end of said liner, movement of said pig through said liner being sufficient to remove substantially all condensate from the inside of said liner.

27. A method of repairing a pipe by everting a liner within said pipe and sealing said everted pipe within said tube comprising:

(a) transporting an everter apparatus to a pipe repair site;
(b) inserting an end of said liner into an inlet port of said everter apparatus, through said everter apparatus, out an outlet port of said everter apparatus and into said pipe;
(c) using an air compressor to generate compressed air;
(d) communicating said compressed air to said everter apparatus;
(e) using said compressed air within said everter apparatus to press a pair of lips located in said inlet port against said liner;
(f) using said compressed air to evert said liner within said pipe to a predetermined distance within said pipe;
(g) flowing a fluid into said line to cure a sealant between said liner and said pipe to seal said liner to said pipe.

28. The method of claim 27 additionally comprising putting a steam cap in communication with said liner, and using said steam cap to supply sufficient steam to within said liner to cure said sealant.

29. The method of claim 27 additionally comprising using less than 5 gallons a minute of liquid during the process of everting said liner through said predetermined distance within said pipe.

30. The method of claim 27 additionally comprising using a vehicle to transport said everter apparatus to the general area of said pipe repair site, detaching said everter apparatus from said vehicle, manually moving said everter apparatus to said pipe repair site and manually angling said everter apparatus to an angle appropriate for everting said liner to repair said pipe.

31. The method of claim 27 additionally comprising using only water which is transported to said pipe repair site for at least some distance by means other than a conduit having a diameter of more than one inch.

* * * * *